(12) United States Patent
Desbrandes

(10) Patent No.: US 8,374,509 B2
(45) Date of Patent: Feb. 12, 2013

(54) PRODUCT, METHOD AND EQUIPMENT FOR REMOTE COMMUNICATION USING CHROMOGENIC MATERIALS

(75) Inventor: Robert Desbrandes, Sevres (FR)

(73) Assignee: Saquant, Givarlais (FR)

( * ) Notice: Subject to any disclaimer, the term of this patent is extended or adjusted under 35 U.S.C. 154(b) by 620 days.

(21) Appl. No.: 12/531,067

(22) PCT Filed: Mar. 12, 2008

(86) PCT No.: PCT/EP2008/052892
§ 371 (c)(1),
(2), (4) Date: Feb. 6, 2010

(87) PCT Pub. No.: WO2008/113721
PCT Pub. Date: Sep. 25, 2008

(65) Prior Publication Data
US 2010/0142968 A1    Jun. 10, 2010

(30) Foreign Application Priority Data

Mar. 12, 2007 (FR) ...................................... 07 01747

(51) Int. Cl.
*H04B 10/00* (2006.01)
(52) U.S. Cl. ............................ 398/135; 398/25; 398/140
(58) Field of Classification Search .................... 398/25, 398/45, 135, 140, 152, 178
See application file for complete search history.

(56) References Cited

U.S. PATENT DOCUMENTS

| | | |
|---|---|---|
| 2003/0133714 A1 | 7/2003 | Gat |
| 2004/0264958 A1* | 12/2004 | Zoller et al. ..................... 398/40 |
| 2005/0231855 A1* | 10/2005 | Tran ........................... 360/324.1 |
| 2007/0158541 A1* | 7/2007 | Katori ............................ 250/281 |
| 2007/0272862 A1 | 11/2007 | Desbrandes et al. |
| 2007/0285843 A1* | 12/2007 | Tran ............................ 360/245.9 |
| 2008/0078961 A1 | 4/2008 | Desbrandes et al. |
| 2008/0101800 A1* | 5/2008 | Waks et al. ................... 398/178 |
| 2008/0317207 A1 | 12/2008 | Desbrandes et al. |
| 2009/0045355 A1 | 2/2009 | Desbrandes |
| 2009/0324217 A1 | 12/2009 | Desbrandes |

OTHER PUBLICATIONS

Hall, "Imprecise Measurements and Non-Locality in Quantum Mechanics", Physics Letters A, vol. 125, No. 2,3, Nov. 2, 1987.
Ghirardi et al, "Experiments of the EPR Type Involving CT'-Violation do not Allow Faster-than-Light Communication between Distant Observers", 1988 Europhys. Lett. 6 95-100, Physical Review Letters.
Stefanov et al, "Quantum Correlations with Spacelike Separated Beam Splitters in Motion: Experimental Test of Multisimultaneity", vol. 88, No. 12, Mar. 25, 2002.

(Continued)

*Primary Examiner* — Dzung Tran

(57) ABSTRACT

The invention relates to products, methods and devices for remote communication or control using chromogenic materials. Several samples including at least one kind of chromogenic materials are simultaneously irradiated or radiated together by an appropriate entangled radiation, e.g, gamma, X, ultraviolet or visible radiation, provided by a cascade from an atomic source, or by the target of a linear particle accelerator or by a non-linear crystal. When the samples are separated, one of them, qualified as the master, is stimulated by a traditional method that uses infrared or white radiation or by heating, and a signal is measured that represents the partially correlated excess variation of opacity or coloration of the other sample(s), qualified as slave(s). There is no known method of interference between the master and the slaves. The slave(s) are the only ones capable of instantaneously receiving the signal from the master through all media and from any distance. The method and the equipment are particularly intended for communication or control applications.

43 Claims, 11 Drawing Sheets

OTHER PUBLICATIONS

Barrett et al, "No Signaling and Quantum Key Distribution", Physical Review Letters, PRL 95, 010503 (2005), Jul. 1, 2005.

Hall Michael, Examiner's first report on patent application No. 2005248906, IP Australia, Jul. 20, 2009.

(no author), "Popper's experiment", http://en.wikipedia.org/wiki/Popper%27s_experiment, Sep. 17, 1994.

Van Gent Daniel Lee, "Remote Stimulated Triggering of Quantum Entangled Nuclear metastable States of 115In", arxiv-org-ftp-nucl-ex-papers-0411-0411050, XP002350122, Nov. 23, 2004.

Duan L-M, "Long-distance quantum communication with atomic ensembles and linear optics", Nature vol. 414, Nov. 22, 2001, XP2453180.

Van Gent Daniel et al, "Remote Stimulated Triggering of Quantum Entangled Photoluminescent Molecules of Strontium Aluminate", arxiv-org-physics-0503052, XP002357341, Nov. 24, 2004.

Gisin Nicolas et al, "Long Distance Quantum Teleportation", Optics & Photonics News, Dec. 2003, p. 39. XP008051513.

Weinfurter Harald et al, "Quantum Communication and Entanglement", ISCAS 2000—IEEE International Symposium on Circuits and Systems, May 28-31, 2000, Geneva, Switzerland.

Julsgaard Brian et al, "Experimental long-lived entanglement of two macroscopic objects", Nature, vol. 413, Sep. 27, 2001. XP-002342852.

Bouwmeester Dik, "Experimental quantum teleportation", Nature, vol. 390, Dec. 11, 1997.

Benett Charles H., "Teleporting an Unknown Quantum State via Dual Classical and Einstein-Podolsky-Rosen Channels", Physical Review Letters, vol. 70, Mar. 29, 1993, No. 13. XP-002342855.

Desbrandes Robert et al., "Intercontinental quantum laisons between entangled electrons in ions traps of thermoluninescent crystals", arxiv-org-quant-ph-0611109, XP002420403, Nov. 10, 2006.

Duan L-M. et al., "Long-distance quantum communication with atomic ensembles and linear optics", Nature, vol. 414, Nov. 22, 2001, p. 413-418.

Malta Marcos et al., "Electrochemical and chromogenic relaxation processes in polyaniline films", Elsevier, Polymer 43 (2002) 5895-5901.

* cited by examiner

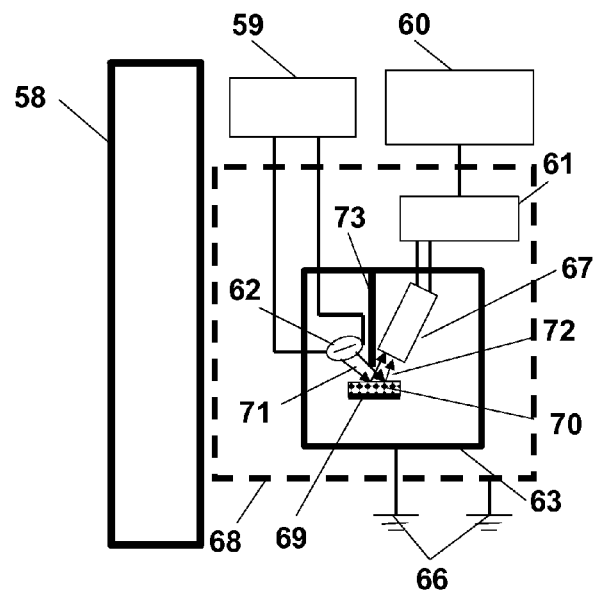
Fig. 17
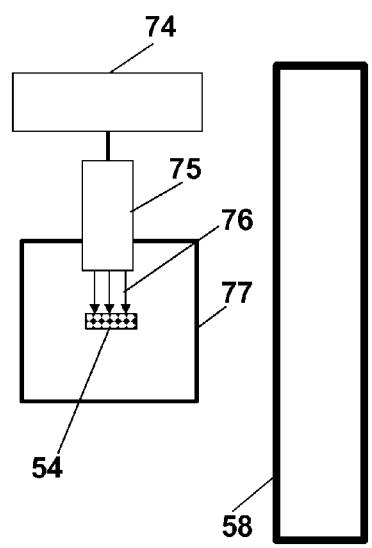
Fig. 18
Fig. 19

PRODUCT, METHOD AND EQUIPMENT FOR REMOTE COMMUNICATION USING CHROMOGENIC MATERIALS

TECHNICAL FIELD

The technical field is quantum transmissions.

The entanglement was modeled mathematically since 1925 by theorists such as M. Planck, E. Schrödinger, A. Einstein, L. of Broglie, W. Heisenberg, W. Pauli, M. Born, P. A. M. Dirac, and a number of others. The interpretation of the quantum theory shows that two particles emitted simultaneously (or almost) by the same object have a common wave function, and the modification of the quantum state of the one of the particles is reflected on the quantum state of the other particle, immediately and wherever it is in the universe.

Some of the theorists were opposed to this interpretation, others accepted it. In particular, A. Einstein in 1935, published a short article [1] in which it indicated that the theory of Quantum Mechanics was incomplete. In 1965 [2], J. S. Bell, while at the CERN, proved that Quantum Mechanics was "not local", i.e. that instantaneous interactions were possible.

It is known to the person skilled in the art that certain nonlinear crystals, for example of BBO (barium borate $BaB_2O_4$ beta), can transform a photon of light into two photons, these photons are entangled [3]. For the photons, the entanglement appears by the fact that their polarization is not defined. When one determines the polarization of one of the photons, the polarization of the other is immediately determined. This was proven in Geneva circa 1995 when entangled photons had been transferred with optical fibers 10 km away.

About 1980, A. Aspect, [4] in the Optical Center of the University of Paris, confirmed experimentally that quantum interactions were "non-local". Since 1990, the experiments follow one another, those of Geneva, others in Austria and in the United States of America, to confirm the entanglement of particles. They are primarily experiments with photons of light, but also with electrons [5]. The potential applications are primarily, for the moment, in cryptography for coded transmissions, and in the field of computers. These applications require however the use of a traditional link, for example an optical fiber, between the "transmitter" and the "receivers". Theoretical and experimental progress was made for the transfer of the entanglement between particles, even when these particles never were in contact [6, 7]. Very recent research in the field shows that the entanglement can worsen by the phenomenon of decoherence [8], but also that, under certain conditions, the decoherence is very weak, even null [9].

Former Techniques:

There exists equipment, which produces a beam of gamma rays or X rays partially entangled [10, 11, 12]. There also exists equipment based on non-linear crystals which emits separate beams of entangled photons [3].

The international patent filing of reference [10] describes a method and an apparatus to modify the lifetime of metastable nuclei based on entanglement. The international patent filing of reference [11] describes a method and an apparatus to use the entanglement of metastable nuclei for telecommunications. This technique presents however the disadvantage of using and/or of producing gamma rays of which the containment induces high costs of exploitation.

The international patent filing of reference [12] describes a method and an apparatus to use the entanglement of the trapped electrons in photoluminescent or thermoluminescent materials for telecommunications. This technique presents however the disadvantage of producing an emission of photons of light only during the period of transmission.

The most powerful equipment uses an accelerated electron beam: each electron causes by Bremsstrahlung effect [13, 14] a spectrum of photons comprising for example photons of types gamma, X, ultra-violets, visible, infrared, or a combination of some of these types of photons. In the case of international filings of reference [10, 11], an intrinsic limitation of the process is that the sum of energies $E_i$ (internal excitation) of k photons entangled between themselves, in whole or in part, produced by Bremsstrahlung effect at the time of the incidence of an electron, is lower or equal to energy E of said electron. The processes of international filings of reference [10, 11] make uses of photons of excitation energies of $E_{ex}$, which must be definitely higher than the value of energy of the isomeric transition $E_m$, for example 1.1 MeV for the Indium nucleus, to obtain a transfer of entanglement by exciting the nuclei of the isomer nuclides to a given metastable state.

In international filing of reference [12], the entanglement of the trapped electrons in the traps of the photoluminescent or thermoluminescent crystals is made by irradiation using entangled photons of types gamma, X, ultra-violets or visible according to the type of traps.

DISCLOSED INVENTION

The present invention makes use of measurements of characteristic parameters resulting from the entanglement of quantum particles.

In a flash of genius, the inventor has determined that some specific chromogenic materials, when they are prepared and exploited according to techniques in relation to the object of this invention which will be taught later, make it possible to implement improved quantum communications by solving a technical problem which was not part of the state of art. In the former techniques, the "entangled" samples include, either a kind of "entangled" isomer nuclides, or a kind of "entangled" photoluminescent materials, or still, a kind of "entangled" thermoluminescent materials. Usage of the quantum connections connecting groups of two or several particles during the stimulation of an "entangled" sample (named by convention "master" sample) causes a transitory surplus variation of emission of photons of a wavelength in relation to the kind of materials, out of the other "entangled" sample or the other "entangled" samples (named by convention "slave" samples). The measurement of this transitory surplus variation of the number of emitted photons can be difficult taking into account the natural emission of photons of the "slave" sample (half-life for the isomer nuclides, and photoluminescence, or fading for the thermoluminescence).

In the present invention, which will be taught in details in the continuation, the surplus variation, according to the case, of opacity or coloring of the kind of chromogenic materials, that occurs in the "slave" sample can be the object of a measurement, either during the application of the stimulation to the "master" "entangled" sample, or later on, taking into account its semi-permanence, which must be evaluated in relation to the duration of the half-life of the excited state of the kind of the considered "entangled" chromogenic materials. The surplus variation of opacity or coloring is the part of the variation which does not occur due to the half-life of the excited state of the kind of chromogenic materials contained in the "entangled" samples. This half-life is obtained for example by an heuristical method taking into account the parameters of environment of the "entangled" samples, for example the duration and the temperature of storage, the duration and the temperature during the usage. Certain kinds of chromogenic materials present a quasi-stable excited state, which results, in this case, in mixing up the surplus variation of opacity or coloring with the variation of the measured opacity or coloring.

The materials used in this invention are chromogenic materials which can be darkened or colored according to the case by visible rays, ultraviolet rays, X rays or gamma rays, which are appropriate to transform the material from it ground state in its excited state, i.e. darkened or colored according to the case. The adequate radiation is well-known to the man of art for each kind of materials.

The chromogenic materials are materials whose color or transparency changes under the effect of various physical actions such as the exposure to certain radiations, the temperature, or an electric field.

The photochromic materials blacken or are colored when they are exposed to an ultraviolet radiation and become again transparent when ultraviolet stimulation disappears. Certain photochromic compositions remain obscure during weeks or remain obscure in a permanent way. Others become again transparent in a few minutes. These materials are used, for example, in the manufacturing of the glasses which blacken or are colored automatically in the light of the sun and become again transparent in the shade.

The photochromatic materials are of several types: some are sensitive to the color of the light and preserve the received color in a permanent way.

The thermochromic materials are sensitive to temperature. They change of color during a change of temperature.

The electrochromic materials are sensitive to electric field: either they are colored, and a voltage applied between their surfaces makes them transparent, or they are transparent, and a voltage applied between their surfaces makes them opaque or colored.

The electrochromic materials include for example materials such as oxides $WO_3$, $NiO$, $IrO$, $V_2O_5$, $MoO_3$ containing some ions such as $Li^+$, $Ag^+$, $Na^+$, $Ba^{2+}$, $Ca^{2+}$.

From a physicochemical point of view, one distinguishes the organochromic materials, which include:
  materials of the spiropyrane type whose color changes by heterolytic rupture of a covalent bond, the products obtained are ions,
  materials of the pyrrole type, or of the hydrazine type, whose color changes by homolytic rupture of a covalent bond, the products obtained are radicals,
  materials whose color changes by cis/trans isomerization, i.e. a change of conformation of the molecule,
  materials whose color changes by tautomerism, i.e. variation of balance between isomers.

The photosensitive materials include, for example, materials such as compounds of spironaphthoxazine, pyridobenzoxazine, of dimethoxybenzoxazine, diarylethenes, dihetarylethenes, fulgimides, and phenoxyquinones.

One shall also mention the crystalline mineral materials in which impurities trap electrons released by an optical radiation, but they are rather phenomena of fluorescence or photoluminescence, which manifest themselves by a colored emission from the material.

Other mineral materials are photochromic glasses (sometimes called photochroms) among which one distinguishes:
  homogeneous photochromic glasses being doped, or containing impurities, for example: alkaline silicates, borosilicates, aluminosilicates,
  photochromic glasses containing a crystallite suspension, for example glasses containing Thallium halides, glasses containing halides of Copper, halides of Cadmium-Copper, or glasses containing silver halides.

The photochromic materials include, for example, materials such as sodocalcic glasses, or sodosilicic glasses (for example, $Na_2O$-$3SiO_2$), containing photosensitive crystals, for example, $AgCl$, $AgBr$, $AgI$, $Cu_3Cl_3$, $Cu_2Br_3$, $Cu_2I_2$, $TlCl$, $CdCl_2$, and ions capable of modifying the fading (for example, $Cu^{2+}$, $Zn^{2+}$, $Pb^{2+}$, $Cd^{2+}$) or such as borosilicate glasses (for example of composition $SiO_2$ (80%), $B_2O_3$ (13%), $Al_2O_3$ (3%), $Na_2O$ (4%), containing impurities).

Models exist to explain the variation of opacity, or of coloring, of these various materials, and they make it possible to optimize their performance. In particular, in the case of the silver halides, crystallites would form colloids contributing to blackening. As indicated previously, photochromic glasses can be bleached by heat, or by an optical radiation. Thermal agitation acts on colloids causing their dissolution. The energy of the optical radiation is absorbed by colloids leading to their dissolution.

The optical bleaching lead to the phenomenon of adaptation to the color. Indeed, the use of a monochromatic optical bleaching radiation of wavelength $\lambda$ causes a selective destruction of the colloids, which absorb this wavelength. Only this wavelength "will be bleached".

Optical bleaching also leads to the phenomenon of polarization. The use of a radiation of polarized optical bleaching polarizes photochromic glasses by bleaching certain colloid sites. The absorption coefficients of these glasses are different for parallely or perpendicularly polarized radiation to the bleaching radiation.

During bleaching by polarized light, the colloids in the direction of the polarized optical radiation are destroyed. A later bleaching by heat, for example, leaves residual clusters among the not destroyed colloids. Thereafter, during a blackening by UV radiation, more colloids are produced in the areas not destroyed by the initial polarized radiation. The residual clusters are used as germs and initial polarization is restored partly. A memory effect is thus present.

In this invention one or more samples of the materials mentioned previously are illuminated, irradiated or bombarded by one or more beams of entangled particles, for example entangled photons or entangled electrons, the beam of particles being appropriate to cause the change of opacity, or the change of coloring, of the chromogenic material. This operation is called the process of "excitation": groups of two or several entangled particles transfer their entanglement to the electrons of the ionic or covalent bonds of the chromogenic materials. Two or several samples obtained according to the process, possibly by division of one or more of the preceding samples, have distant quantum couplings, and form samples called by convention "entangled" samples. These "entangled" samples are used to remotely transmit or receive one or more information or commands according to the processes described below. One of these "entangled" samples then forms a product to communicate, for a use either in quantum emission, or in quantum reception.

The quantum emission of information or commands is obtained by means of a process of "stimulation" of at least one of the "entangled" samples, qualified as "master", for example by a heating, or an illumination, or an application of an electric field, which are appropriate to make the chromogenic material go from its excited state to its ground state.

The quantum reception of information or commands is obtained by means of a process of optical measurements of a surplus variation of transparency or coloring on at least one other of the other "entangled" samples, qualified as "slave".

In a particular mode of the invention one uses photochromic materials [15] such as glasses containing silver chloride. This salt is present in transparent glasses in an ionized form. Ionic bonds exist then between silver ions and chlorine ions.

Chlorine has a potential of ionization of 12.97 eV and Silver a potential of ionization of 7.58 eV. In the reaction hereafter:

$$Cl^- + Ag^+ + h\nu \Leftrightarrow Cl + Ag$$

h is the Planck's constant,
ν is the frequency of the photons.

A photon hν of (12.97–7.58 eV), that is 5.39 eV, has a sufficient energy so that the reaction occurs. The energy of 5.39 eV corresponds to the energy of the near ultraviolet photons (400 nm). These photons cause the rupture of the ionic bond and the formation of silver atoms in colloidal form making the medium opaque or partially opaque. Copper ions $Cu^+$ and $Cu^{2+}$ are generally used for the kinetic control of the reaction.

Other halogenous ions can be used such as, for example, $Br^-$, $I^-$, $At^-$, as well as other metal ions such as, for example, $Na^+$, $Ba^{2+}$, $Ca^{2+}$. Divalent ions such as, for example, $Cu^+$, $Cu^{2+}$, $Zn^{2+}$, $Pb^{2+}$, $Cd^{2+}$, have the property to modify the return time to the transparency and can even with certain concentrations make it possible to conserve opacity.

It is also interesting to note that an increase in the temperature or the exposure to certain wavelengths enable the return to the transparent ionic form $Cl^- + Ag^+$.

On the contrary, a fall in the temperature or a containment in an obscure enclosure makes it possible to slow down the return to the transparent form.

The process of excitation to form "entangled" samples thus consists in irradiating material containing some silver chloride with for example a radiation of entangled ultraviolet photons. The quantum process of emission consists in stimulating an "entangled" sample, qualified as "master", for example by heating or by the exposure to an infrared radiation. The quantum process of reception is done by measurement of a surplus variation of opacity or coloring of another "entangled" sample, qualified as "slave", taking into account the half-life of the excited state.

In another particular mode of the invention, one uses plastics containing organic polymers having photochromic properties. For example, some materials such as the spironaphthoxazine that have two forms: an opaque, or partially opaque, or colored, "closed" form which can be excited to a transparent, or partially transparent, "open" form, in certain visible bands. The terms of "closed" or "opened" respectively indicate benzene cycles closed or opened in the molecules. The process of excitation is done by the passage from the "open" form to the "closed" form, for example, by the irradiation of entangled ultraviolet photons. This ultraviolet irradiation has the property to modify the covalent bonds between electrons of the organic molecules to excite them towards their "closed" form and to produce the entangled samples. The quantum process of emission is made by an infrared irradiation of one "entangled" sample, qualified as "master", which modifies the covalent bonds of the form closed molecules to stimulate them towards their "open" forms. The quantum process of reception is done by measurement of a surplus variation of opacity or coloring of another "entangled" sample, qualified as "slave".

In another particular mode of the invention, one uses the molecules such as the pyridobenzoxazine or the dimethoxybenzoxazine, possibly in mixture, to obtain plastic compounds with particular absorption bands. In this mode, the photochromic plastics with "two photons" are preferred. The process of excitation of these plastics comprises the passage from the "open" form, that is transparent, to the "closed" form, that is opaque or colored, by exciting the material with entangled photons of a wavelength known to the man of art. The "closed" form is metastable. The "closed" molecules are then entangled and contained in the "entangled" samples. The quantum process of transmitting is done by the return to the "open" form by stimulation of an "entangled" sample, qualified as "master", using photons of another wavelength known to the man of art. The quantum process of reception is done by measurement of a surplus variation of opacity or coloring of another "entangled" sample; qualified "slave".

There exist large number of organic molecules which can be used in the invention, for example, the diarylethenes, the dihetarylethenes, the fulgimides, and phenoxyquinones. An increase in the temperature or the exposure to certain wavelengths induces a return to the "open" form of the molecules, which is transparent or partially transparent. Certain molecules make it possible to have various colors for the "closed" form and the "open" form.

In another particular mode of the invention, one uses some electrochromic materials. An example of such material uses the following reaction:

$$WO_3 \text{ (transparent)} + xLi^+ + xe^- \Leftrightarrow Li_xWO_3 \text{ (blue)}$$

Other oxides can be employed such as, for example, NiO, IrO, $V_2O_5$, $MoO_3$, as well as other ions such as, for example, $Ag^+$, $Na^+$, $Ba^{2+}$, $Ca^{2+}$.

The process of excitation corresponds to the reaction above: a bombardment of entangled electrons or a radiation of entangled photons of high energy, which is appropriate, causes the excitation in the form of the addition of an entangled electron to the mixture: $WO_3$ (transparent)+x $Li^+$, and the formation of the $Li_xWO_3$ salt which is blue in the "entangled" samples. The process of quantum emission uses the passage of an electric current which electrolyzes the salt comprised in the "entangled" sample, qualified as "master", and the opposite reaction is produced, causing a stimulation and a return of the transparency. The quantum process of reception is done by the measurement of a surplus variation of opacity or coloring of another "entangled" sample, qualified as "slave".

Oxides and ions combinations make it possible to obtain various colors, as well in the form before excitation as in the form after stimulation.

An illustration of various modes of the invention is carried out below by means of figures.

FIG. 1 schematically illustrates an example of process of excitation in the case of the reaction of chlorine-silver photochromism. Electrons are torn off from chlorine ions (1) and (2) from the samples (7) by entangled photons (5) and (6). When two or several entangled photons cause the above mentioned reaction nearly simultaneously, the electrons are entangled and leave the chlorine ions (1) and (2) as shown in FIG. 1; they join the silver ions to form some colloids and remains entangled. The entangled electrons are collected by the silver ions (3) and (4), which become silver causing the darkening of the medium and the formation of the "entangled" samples.

FIG. 2 schematically shows the wavelengths of the photons which produce the reaction of darkening for sodosilicic glasses doped with the silver chloride. The optimal wavelength of the entangled photons of excitation can be, for example, of 375 nm as the curve (8) shows.

FIG. 3 illustrates the "entangled" samples (7' and 7") which contain entangled electrons (9) and (10) trapped in silver atoms. The state Cl+Ag is a metastable state of which the lifetime depends on additional ions such as, for example, $Cu^+$, $Cu^{2+}$, $Zn^{2+}$, $Pb^{2+}$, $Cd^{2+}$.

During the process of excitation represented on FIG. 1, the samples (7) comprising a great number of silver and chlorine atoms, are subjected to one or more beams of suitable entangled photons (5 and 6): This or these samples once excited then present a certain opacity or coloring. This or these "entangled" samples, after a possible division after or before the process of excitation, form the "entangled" samples in whole or in part (7' and 7") represented on FIG. 3 and characterized in that some distant quantum couplings ($\Psi$) are present between the electrons collected by the silver atoms. These "entangled" samples (7' and 7") then form products ready to allow quantum communications as described below. These "entangled" samples can be separated by a long distance while preserving their entanglement according to the properties of the metastable state.

The process of stimulation consists in causing the collapse of whole or part of the wave functions of entanglement linking the electrons trapped in the "entangled" samples.

During the process of "stimulation", a sample (7'), "entangled" in whole or in part, is stimulated, for example by heating by means of a resistance (16), like schematically illustrated on FIG. 4. Chlorine ions (1) and (2) and silver ions (3) and (4) form again in the stimulated "entangled" sample and in the other "entangled" samples (7") which are distant and are not stimulated. They return then to a stable initial state: The stimulated "entangled" sample (7') becomes again completely or partially transparent. The other not stimulated "entangled" samples (7") become again partially transparent according to the optimization of the distribution of distant quantum couplings with the stimulated "entangled" sample (7'). The large distance which can separate the "entangled" samples is schematized in (15). On FIG. 4, the samples are represented in a partially excited state before the application of the process of stimulation. The arrows in dotted lines represent the deexcitations of the electrons already obtained or to come according to the position of the electrons.

During the process of "stimulation", an "entangled" sample (7'), qualified as "master", is stimulated for example by an infrared irradiation (17) like schematically illustrated on FIG. 5. Certain chlorine ions (1) and (2) and silver ions (3) and (4) form again in the stimulated "entangled" sample (7') and also in one or more other distant "entangled" samples (7") which are not stimulated. They return then in the initial stable state: The stimulated "entangled" sample (7') becomes again completely or partially transparent. The other or the others "entangled" samples which are not stimulated (7"), qualified as "slaves", become again partially transparent according to the optimization of the distribution of distant quantum couplings with the stimulated "master" "entangled" sample. The large distance which can separate the "entangled" samples (7' and 7") is schematized by (15).

The curve (18) of FIG. 6 schematically shows the wavelengths of the photons which can be used in the process of stimulation to cause the return to the state completely or partially transparent of the materials of the photochromic type. For doped sodosilicic glass with silver chloride, for example, the optimal wavelength is about 800 nm.

In a particular mode of the invention one uses certain glasses which can contain several types of colored sites. In the case of a product made up of "entangled" samples with two types of sites, one applies a process of stimulation of a master "entangled" sample comprising a characteristic profile corresponding to a rise in temperature followed by a descent in temperature. One measures then on one of the other "entangled" samples, the slave "entangled" sample, a discoloration which results in the curves of FIG. 7. The curve (19) corresponds to the distant action of the rise in temperature of the master "entangled" sample and the curve (20) corresponds to the distant action of the descent in temperature of the master "entangled" sample. These curves come from the fact that all the colloid sites do not generally fade during the rise in temperature. The derivative (21) of these curves, on FIG. 8, shows a site of coloring at 140° C. and another one at 245° C. in this particular example. It will be noted that raw measurements presenting an important noise, one eliminates this noise by computations of suitable running averages. It is then possible to determine using the preceding measurements with a method of correlation, either versus time, or by transposition in temperature, according to the "characteristic profile" applied, the moment when the process of stimulation according to this "characteristic profile" has been applied to the distant "entangled" sample.

The particular mode of the invention illustrated previously can be generalized in that one carries out the transmission of information between "entangled" samples by means of at least one characteristic profile. The quantum process of emission is carried out by means of a stimulation, either by thermo-deexcitation, or photo-deexcitation, or by a combination of both, on whole or on part of a said "entangled" sample, called the master "entangled" sample, during a time interval, by applying, according to the mode, one or successively several heuristical profiles of variation of at least one parameter of stimulation applied versus time, called by convention "characteristic profiles", in order to transitorily modify the probability of deexcitation of some of the entangled trapped electrons in chromogenic material, by means of the stimulation applied by one or several of the aforesaid "characteristic profiles", and optionally by feedback. The quantum process of reception versus time comprises at least one series of measurements of the surplus variation of opacity or coloring in at least one optical line, or in at least one band of optical wavelengths, on at least one of the other "entangled" samples, called the slave "entangled" sample, one or more of the aforesaid series of measurements being interpreted by at least one method of computation of the correlation, in relation to at least one property of one or several of the "characteristic profiles" used in the "quantum emission", to determine the reception of at least one information, coded by the aforementioned or several aforementioned "characteristic profiles".

Various particular modes of the invention are presented thereafter: At the time of the process of excitation, one or several samples chosen to form the products can be irradiated by only one beam containing some entangled photons and in this case the entanglement is transmitted to electrons in each sample and between samples as shown in the FIG. 9. On this figure, entangled photons (36) are emitted either by a generator (22) which can be for example: either a particle accelerator provided with a target (34), or a radioactive element which emits photons in a cascade, or an ionized gas which also emits photons in a cascade. These photons are directed through the window (38) to reach the samples (25) and (26). In the case of photons X or gamma a phantom (41) is necessary to stop the photons that are not absorbed. In this mode, the "entangled" samples present at the same time distant and non-distant couplings. It is the same when the same "entangled" sample is subdivided to form "entangled" "samples.

FIG. 10 represents the implementation of a particular mode of the process of excitation of chromogenic samples placed on two superimposed supports using the apparatus describes in FIG. 9 whose reference marks are applicable here. In this figure a processor (43) monitors the operation of the motor (49), of the mechanism of radial positioning (27), and of the activation of the irradiation treatment (32). The supports containing at least one sort of chromogenic materials, for example the discs (45) and (46) are superimposed in order to simultaneously allow the formation of spots of irradiation to make the "entangled" samples according to a defined scheduling on each support. It is also possible to irradiate only one chromogenic support and to divide it after the treatments of irradiation. A possible reflective or conducting layer can be added after the formation of the entangled samples on whole or on part of some of the supports according to the processes of quantum emission or quantum reception planned for the use of the supports.

The samples can also be excited by two separate beams of entangled photons which transmit their entanglement to the electrons of the ionic or covalent connections of the chromogenic samples.

FIG. 11 represents the diagram of a typical operation using a nonlinear crystal excited by a laser beam. A excimer laser (28) emits a vertically polarized beam, for example, with one wavelength, for example, of 193 nm. The crystal (29) emits in two directions on the vertical plan two beams: one (30) vertically polarized is called by convention "idler" of wavelength in this case of 396 nm, the other (31) polarized horizontally called "signal" of wavelength also of 396 nm. The photons which compose these beams are entangled in pairs. It is also possible to have beams of different wavelengths.

FIG. 12 represents a particular mode of the invention, when the samples require only visible or ultra-violets entangled photons for their excitation. One can directly use the radiations of entangled photons (30) and (31) coming from the nonlinear crystal (29) subjected to the beam of the excimer laser (28). In this case the rate of excitation of the samples depends only on the effectiveness of the transmission of the entanglement to the particles of the samples because the photons of the beams (30) and (31) are almost completely, or completely, entangled in pairs. The rate of distant quantum couplings is then optimized. A phantom (41) is positioned in front of the residual beam of the excimer laser. For the implementation of the supports comprising a plurality of "entangled" samples, it is possible to produce successively some collections of samples, possibly in several devices working in parallel, then to distribute them according to a defined scheduling on the supports. It is also possible to produce the supports in a suitable device.

FIG. 13 illustrates a particular mode of the invention for implementing the apparatus of excitation, on which one finds certain elements of FIGS. 11 and 12 which will not be described in details: a laser (28), and a nonlinear crystal (29). The process of excitation employed consists of an illumination with entangled beams of entangled ultraviolet photons produced by a nonlinear crystal, for example of BBO, as described on FIG. 11. The groups of entangled samples are produced on small surfaces in relation between each other on the two discs. Each surface, which is part of a group of samples in relation, is illuminated simultaneously on one of the discs (44) by the beam "idler" (30) and on the other disc (45) by the beam "signal" (31), this process being repeated successively for each group of samples that are entangled in relation between each other to form the supports called by convention "entangled" discs. It is possible to irradiate successively a great number of samples distributed on the discs (44) and (45): Two obturators (23) and (24) reduce the "entangled" beams (30) and (31) to the dimension of spots to form a set of two "entangled" samples (25) and (26). They can be briefly open to form discrete spots. Each disc is actuated in rotation by the motors (48) and (49), for example by a step motor, in the case of discrete samples or by a synchronous motor in the case of continuous samples. A mechanism (27) ensures the radial positioning which makes it possible to simultaneously define two spots in relation on each disc according to a defined scheduling. A processor (43) controls the operation of the motors (48) and (49), mechanisms of radial positioning (27), obturators (23) and (24), and laser (28). According to the processes of quantum emission and reception used, and according to the chromogenic materials, for example in the presence of photochromic or electrochromic samples, it can be advantageous before or after the treatment of excitation, to add according to the case, on the lower face of the discs a reflective and/or conducting surface not represented.

FIG. 14 represents another particular mode of the invention for implementing the apparatus of excitation for the entanglement of two samples using two separate beams. On this figure, a laser (28) emits a beam towards a nonlinear crystal (29), this one emits two entangled beams (30) and (31) as indicated on FIG. 11. These entangled beams are introduced into PMA modules (Photon Multiplying Accelerating module) (32) and (33) which are not detailed on the figure. In a PMA module, the entangled photons of a beam generate some entangled electrons in whole or in part by means of photocathodes which transfer the entanglement to the generated electrons. These entangled electrons are then multiplied by stages of dynodes which transfer in whole or in part the entanglement from the primary electrons to the emitted electrons, and which end in a non-collecting anode. These entangled electrons in whole or in part are then accelerated. The entangled accelerated electron beams in whole or in part, strike the targets (34) and (35), which produce the beams of entangled photons (36) and (37) by Bremsstrahlung effect. Two windows (38) and (39) reduce the beams to the dimension of the samples (25) and (26). Two phantoms (40) and (41) stop the photons which have not been absorbed in the case of photons X or gamma.

In another particular mode, one can use the beams of entangled electrons produced directly above by removing the targets, this, when the chromogenic material can be excited to its metastable state by a bombardment of electrons.

In another particular mode of the invention, it is also possible to use a hot cathode and only one PMA module to replace the photocathode, and to produce an electron beam entangled in whole or in part and/or to divide the electron beam produced in whole or in part. The person skilled in the art can obviously adapt the devices to obtain the irradiation which is appropriate to excite the chromogenic materials in its metastable state.

FIG. 15 illustrates a particular mode of the invention for implementing the apparatus of excitation, on which one finds certain elements of FIGS. 11 and 14 which will not be described in details and the possibility of irradiating a plurality of samples distributed on two supports, for example the discs (44) and (45). Two beams of entangled photons (30) and (31) are produced by the nonlinear crystal (29) and the incident laser (28). Accelerated entangled electron beams are produced in PMA modules (32) and (33) above described. The impact of the entangled accelerated electron beams on targets produces by Bremsstrahlung effect two beams of entangled photons. Two windows (38) and (39) reduce the beams of entangled photons to the dimension of the spots forming samples (25) and (26) or to the dimension of the circular tracks in the case of a continuous track. These discs, in the case of the use of photochromic or electrochromic samples for example, can have, on each one, a reflective and/or conducting surface (46) and (47). Each disc is actuated in rotation for example by a step motor in the case of discrete samples, or by a synchronous motor (48) and (49) in the case of continuous samples. A processor (43) controls the operation of the motors (48) and (49), accelerators (32) and (33), and laser (42). Two phantoms (40) and (41) are used in the case of an irradiation X or gamma.

The entanglement of the "entangled" samples of the product thus obtained is used for the transmission of information or of commands. The necessary measurements are carried out in various ways and are part of this invention.

One means by the master "entangled" sample, the "entangled" sample used for the quantum emission and by slave the sample used for the quantum reception. The deexcitation of a master "entangled" sample is obtained for example by heating, optical irradiation, or application of an electric field and will be called "stimulation" in the continuation of this invention disclosure.

The stimulation of the master "entangled" sample causes its return to a state more or less close to the initial state of transparency or coloring of the non-excited particles (ground state). The entangled particles and those non-entangled particles are affected by the operation of stimulation of the master "entangled" sample.

Stimulation can be made on the master "entangled" sample either by heating, or by an optical irradiation that is not filtered, or by optical irradiation with certain wavelengths, on whole or on part of the surface, or by the application of an electric field on whole or on part of the volume. It can also be made on a small proportion of the volume or the surface of the master "entangled" sample.

In the particular case of the silver chloride, cooling promotes the reaction of obscuration, the rise in the temperature promotes the reaction of transparency. Other halogens, as iodine or bromine, can be used, just like other salts, like silver nitrate, with similar properties. The person skilled in the art will be able to take account of the particular properties of each chromogenic material to optimize the processes of conservation and stimulation of the "entangled" samples.

The quantum process of reception comprises the determination of at least one distant information or command by means of at least one optical measurement of a surplus variation of the transparency or of the coloring of an "entangled" sample called slave and presenting distant quantum couplings with a master sample which is stimulated. Various processes of quantum reception can be implemented on an "entangled" slave sample.

It will be noted that a significant advantage of the quantum process of reception is that certain of the measurements necessary to determine a surplus variation of the transparency or coloring of an "entangled" slave sample can be differed, since the change of transparency or coloring is quasi-permanent following the application of the process of stimulation on the corresponding master "entangled" sample.

In the case of "entangled" supports, for example of the discs, it can be advantageous for the use in certain processes of quantum reception, to apply to whole or part of the supports a complementary treatment of excitation by means non-entangled particles so that whole or part of chromogenic materials become opaque or colored according to the case.

Characterization of Simple Products to Communicate:

In summary, the invention includes a simple product to communicate made of a sample containing at least one sort of chromogenic materials excited to at least one metastable state completely or partially opaque or colored, except for the materials purely thermochromic into which the typical property of entanglement was introduced. It is characterized in that some of the electrons present in ionic or covalent bonds of one or several of the aforesaid excited chromogenic materials, are entangled with electrons present in ionic or covalent bonds of one or more other samples. This sample is called thereafter by convention "entangled" sample. It can be separated in space of the other samples and present distant quantum couplings between some of its electrons and some of the electrons of one or some of the aforesaid other samples.

In a particular mode, the preceding simple product includes at least one sort of photochromic materials.

In another particular mode the simple product to communicate includes at least one sort of photosensitive materials.

In another particular mode, the simple product to communicate includes at least one sort of electrochromic materials.

In another particular mode, the simple product to communicate includes at least one sort of organochromic materials.

In another particular mode, the simple product to communicate includes at least one sort of chromogenic materials which is neither photoluminescent, nor thermoluminescent in order not to disturb the measurements of surplus variation of opacity or coloring on this product.

Manufacturing Processes of Simple Products to Communicate:

The main manufacturing process of the simple product to communicate can, for example, include at least the next steps:

(a) Preparation of one or more samples simultaneously, this or these samples containing at least one sort of chromogenic materials having at least one metastable state completely or partially opaque or colored, except purely thermochromic materials.

(b) At least one of the following treatments, called treatment of excitation thereafter, either at least one bombardment, or at least one irradiation, or at least one illumination of the said samples by means of particles which are appropriate to excite the sort of chromogenic materials maintained in a metastable state and to induce the typical property of entanglement. For this purpose the bombardment, or the irradiation, or the illumination contains groups of entangled particles. These entangled particles transfer their entanglement to chromogenic materials by exciting them to their metastable state. One or several of these samples can be divided and/or separated to form at least a collection of samples which are called by convention system of "entangled" samples, each "entangled" sample forming the simple product to communicate as mentioned above. Two or more kinds of chromogenic materials may be used without leaving the framework of this invention.

In a particular mode, the main manufacturing process of the simple product uses a treatment of excitation making use of at least one sort of photons which are appropriate to excite the sort of chromogenic materials to its metastable state. These photons are, for example, entangled gamma, entangled X, entangled visible photons, or entangled ultra-violets photons. They, for example, are emitted either by a natural or artificial radioactive material composed of atoms emitting several photons in a cascade, or by a target bombarded by accelerated particles which emits groups of photons by Bremsstrahlung effect, or by a material made up of atoms emitting groups of entangled photons in a cascade by ionization, or by a generator of groups of entangled photons emitting these groups of photons distributed in at least two separate beams and partially or almost completely "entangled".

In another particular mode, the manufacturing process of the simple product uses a treatment of excitation making use of accelerated electrons which are appropriate to excite the sort of chromogenic materials to its metastable state. One can use for example entangled electrons coming from either from the photocathodes themselves illuminated by entangled photons coming from a nonlinear crystal, or from a multiplier-accelerator of electrons producing the entangled electrons.

In another particular mode, the manufacturing process of the simple product uses a treatment of excitation making use of accelerated electrons which are appropriate to excite the sort of electrochromic materials to its metastable state, that is to say of at least one sort of photons which are appropriate to excite the aforementioned sort of electrochromic materials to said metastable state, and selected among entangled gamma or entangled X.

In a particular mode of the manufacturing process of the simple product using a treatment of excitation making use of at least one sort of photons describes before, the sort of chromogenic materials used contains ionic bonds between metal atoms and halogenous atoms. These connections are broken during said treatment of excitation to a metastable state of the materials: during this treatment of excitation, the entangled photons transfer their entanglement to the electrons released by the ionic connections, these electrons being captured by the metal atoms.

In another particular mode of the manufacturing process of the simple product using a treatment of excitation making use of at least one sort of entangled photons describes before, the sort of chromogenic materials used is a sort of organochromic materials having at least one covalent bond which makes it possible to pass from the ground state of an open form to a closed form. This closed form constitutes the metastable state which is obtained during the treatment of excitation. The entangled photons transfer their entanglement to the electrons making these covalent bonds.

In another particular mode of the manufacturing process of the simple product using a treatment of excitation making use of at least one sort of entangled particles describes before, the sort of chromogenic materials used is a sort of materials non-photoluminescent and non-thermoluminescent.

In another particular mode of the manufacturing process of the simple product using a treatment of excitation making use of at least one kind of entangled particles describes before, the sort of chromogenic materials used is a sort of photochromic materials.

In another particular mode of the manufacturing process of the simple product using a treatment of excitation making use of at least one sort of entangled particles described before, the sort of chromogenic materials used is a sort of photosensitive materials.

In another particular mode of the manufacturing process of the simple product using a treatment of excitation making use of at least one sort of entangled particles described before, the sort of chromogenic materials used is a sort of electrochromic materials.

In a main mode of exploitation, either of the main process of manufacturing of the simple product, or of any of the particular modes of the main process of manufacturing of the simple product described above, one carries out at least the following additional steps:

(a) one separates in space whole or part of the aforesaid "entangled" samples of the system of "entangled" samples, (b) one uses in a device of "quantum emission" at least one of the "entangled" samples to remotely transmit at least one information or at least one command. For this purpose, one exploits whole or part of the distant quantum connections by causing at least one stimulation, which is appropriate to cause the return to the ground state of the kind of excited chromogenic materials, applied to the "entangled" sample, qualified as master "entangled" sample (54, 69, 94, 110), for example, either by heating it in his totality, or by heating it in at least one spot of his surface, or by optical stimulation using at least one flash of infra-red, visible or ultraviolet light on its totality, either by optical stimulation using at least one flash of infra-red, visible or ultraviolet light in at least one spot of his surface, or by application of an electric current in the particular case of electrochromic materials. This stimulation characterizes an information or a command to be remotely transmitted.

(c) one uses in a device of "quantum reception" at least one of the "entangled" samples to receive at least one information or at least one remote command. For this purpose, one exploits whole or part of the remote quantum connections in real-time or in differed time in order to determine, either at least one detection of a remote information, or at least one detection of a distant command, by means of at least one measurement, made with a source of light and a detector of light, for example a photomultiplier or one or several photodiodes, of at least one surplus variation of opacity or coloring, on the kind of chromogenic materials or at least one kind of chromogenic materials contained in at least one "entangled" sample, qualified as slave "entangled" sample (65, 70, 89, 101, 116).

In a secondary mode and anyone of the main modes of the exploitation processes described previously, on one hand, the "quantum transmitter", or at least one of the "quantum transmitters", applies a stimulation by means of at least one "characteristic profile" at one predetermined instant, or on a predetermined temporal window that may be variable according to a pseudo-random law. On the other hand, the "quantum receiver", or at least one of the "quantum receivers", applies the process to determine either at least one detection of a remote information, or at least one detection of a remote command, either in relation to a predetermined instant, or in relation to the predetermined temporal window, that may be variable according to the aforementioned pseudo-random law.

In another particular mode, either of the main process of manufacturing of the simple product describes previously, or of anyone of its particular modes described previously, or in anyone of the main modes of the exploitation process described above, or in anyone of their secondary modes described previously, the kind of chromogenic materials used is a kind of materials that is non-photoluminescent and/or non-thermoluminescent.

Processes of Use in Quantum Emission:

The process of use of the simple product to remotely transmit information or a command, is also called the main process of quantum emission. It is characterized in that one exploits distant quantum couplings of the "entangled" sample by causing at least one stimulation of de-excitation of the electrons of ionic or covalent connections, called thereafter stimulation, which is appropriate to cause the return to the ground state of the sort of excited chromogenic materials used. One calls the "entangled" sample used, the master "entangled" sample. The process can include a stimulation of the "entangled" sample used, for example, either by heating it in its totality, or by heating it in at least one spot of its surface, or by optical stimulation using at least one flash of infrared, visible or ultraviolet light on its totality, or by optical stimulation using at least one flash of infrared, visible or ultraviolet light on at least one spot of its surface, or by application of a electric current in the particular case of electrochromic materials. This stimulation characterizes information or a command to be remotely transmitted.

In a particular mode of the main process of quantum emission, the sort of chromogenic materials contained in the master "entangled" sample is a sort of photochromic materials.

In another particular mode of the main process of quantum emission, the sort of chromogenic materials contained in the master "entangled" sample is a sort of photosensitive materials.

In another particular mode of the main process of quantum emission, the sort of chromogenic materials contained in the master "entangled" sample is a sort of electrochromic materials.

In another particular mode of the main process of quantum emission, stimulation of the master "entangled" sample by infrared, visible, or ultra-violet radiations is optimized in energy of the photons for at least one sort of chromogenic materials. This mode may be more favorably applied when at least one kind of the excited chromogenic materials used is either a kind of photochromic materials, or a kind of photosensitive materials.

In another particular mode of the main process of quantum emission, the master "entangled" sample is stimulated by at least one beam, for example produced by a laser, in one spot of its surface, this point representing a surface from 100 square nanometers to 1 square centimeter. This mode may be more favorably applied when at least one kind of the excited chromogenic materials used is either a kind of photochromic materials, or a kind of photosensitive materials.

In another particular mode of the process of quantum emission, or of anyone of the preceding particular modes of the process of quantum emission, the stimulation applied to the master "entangled" sample is modulated, either at least in amplitude, or at least in time.

In another particular mode of the process of quantum emission, or of anyone of the preceding particular modes of the process of quantum emission, one carries out stimulation by means of at least one characteristic profile during one time interval, by applying, according to the mode, one or successively several heuristical profiles of variation of at least one parameter of stimulation applied versus time, called by convention "characteristic profiles", in order to transitorily modify the probability of deexcitation of some of the entangled trapped electrons in the chromogenic material, by means of the stimulation applied by one or several of the aforesaid "characteristic profiles", and optionally by feedback.

In another particular mode of the main process of quantum emission, or of anyone of the preceding particular modes of the process of quantum emission, the sort of chromogenic materials contained in the master "entangled" sample is a sort of materials non-photoluminescent and non-thermoluminescent.

Processes of Use in Quantum Reception:

The process of use of the simple product to receive at least one information or at least one distant command, is also called the main process of quantum reception. It is characterized in that to receive at least one information or at least one distant command, one exploits the aforementioned distant quantum couplings in real-time or in differed time in order to determine, either at least one detection of distant information, or at least one detection of a distant command, by means of at least one measurement, made with a source of light and a detector of light, for example a photomultiplier or a photodiode, of at least one surplus variation of opacity or coloring, on at least one sort of the chromogenic materials contained in at least one "entangled" sample, qualified as slave "entangled" sample.

In a particular mode of the main process of quantum reception, the sort of chromogenic materials contained in the slave "entangled" sample is a sort of photochromic materials.

In another particular mode of the main process of quantum reception, the sort of chromogenic materials contained in the slave "entangled" sample is a sort of photosensitive materials.

In a particular mode of the main process of quantum reception, the sort of chromogenic materials contained in the slave "entangled" sample is a sort of electrochromic materials.

In another particular mode of the main process of quantum reception, or of anyone of the preceding particular modes of the main process of quantum reception, the determination, either of at least one detection of distant information, or of at least one detection of distant command, versus time comprises at least one series of measurements of the surplus variation of opacity or coloring in at least one optical line, or in at least one band of optical wavelengths, on at least one slave "entangled" sample. One or more of the aforesaid series of measurements are interpreted by at least one method of calculating the correlation, in relation to at least one property of one or several "characteristic profiles" used in the distant activation of quantum couplings, to determine the reception of at least one information, coded by one or several of the "characteristic profiles".

In another secondary particular mode of the preceding process, the determination mentioned exploits at least two series of measure out of at least two slave "entangled" samples to carry out the method of calculating the correlation.

In another particular mode of the main process of quantum reception, or of anyone of the preceding particular modes of the process of quantum reception, the sort of chromogenic materials contained in the slave "entangled" sample is a sort of materials non-photoluminescent and non-thermoluminescent in order not to disturb the aforementioned measurements of surplus variation of opacity or coloring on the "entangled" sample.

Characterization of the Complex Products to Communicate:

The complex product to communicate is characterized in that it includes a plurality of "entangled" samples of the simple product to communicate as mentioned above. They are laid out on a support, for example a disc, called thereafter by convention "entangled" support. These "entangled" samples are positioned on the support according to a defined positioning, whole or part of these "entangled" samples each presenting distant quantum couplings with one or more other samples distributed on one or on more other supports. Other types of supports, differing from discs, may be used without leaving the framework of this invention, at least two such supports being called by convention "entangled" supports, when they comprise at least one "entangled" sample pertaining to a system of "entangled" samples. These "entangled" supports are for example films, or integrated circuits, etc and they may be different. On one hand they may be specifically adapted to their use by the process of quantum emission, or by anyone of the particular modes or sub-modes of the process of quantum emission which have been described previously. On the other hand, they may be specifically adapted to their use by the process of quantum reception, or by anyone of the particular modes or sub-modes of the process of quantum reception which have been described previously.

In a particular mode of the complex product to communicate, at least one of these "entangled" supports is an integrated circuit associating to at least some "entangled" samples, a microelectronic device which is appropriate to stimulate whole or part of the aforesaid "entangled" samples, for example by means of integrated diodes.

In another particular mode of the complex product to communicate, at least one of these "entangled" supports is an integrated circuit associating to at least some "entangled" samples, a microelectronic device which is appropriate to measure at least one surplus variation of opacity or coloring, for example by transparency by means of diodes and of integrated photodiodes.

Devices for Manufacturing the Complex Product to Communicate:

The device for the implementation of the manufacturing process of the simple product to communicate applied to the manufacturing of "entangled" supports forming the complex product described above, is characterized in that it includes at least one apparatus of excitation used to apply the treatment of excitation to one or several samples, at least two of these "entangled" samples being distributed to at least two supports. This process is repeated as much as needed to produce some supports containing at least one plurality of "entangled" samples distributed according to at least one defined scheduling according to the optimization of the device, and forming the "entangled" supports.

Devices of Quantum Emission Using the Complex Product to Communicate:

The main device of quantum emission is a device for the implementation of the main quantum process of emission, or anyone of the particular modes or sub-modes of the main quantum process of emission described previously, applied to the complex product for communication, or to anyone of the particular modes of the complex product for communication described previously. It is characterized in that it includes at least one apparatus of stimulation intended to apply the stimulation to at least one "entangled" samples of the "entangled" support, to remotely transmit at least one information or a command.

Devices of Quantum Reception Using the Complex Product to Communicate:

The device of quantum reception is a device of implementation of the main quantum process of reception, or anyone of the particular modes or sub-modes of the main quantum process of reception described previously, applied to the complex product for communication, or to anyone of the particular modes of the complex product for communication described previously. It is characterized in that it includes at least one detector of the light emitted by a source of light, intended to measure at least one surplus variation of opacity or coloring on at least one of the "entangled" samples of the "entangled" support, to determine at least one distant information or one distant command.

In a particular mode of the main device of quantum reception, the device of quantum reception using the complex product for communication, is characterized in that the light emitted by the source of light is reflected by a mirror positioned in relation to the slave "entangled" sample, the detector of the light measuring the surplus variation of opacity or coloring by means of rays refracted by the sample.

In another particular mode of the main device of quantum reception, or of the preceding particular mode, the device of quantum reception using the complex product for communication, is characterized in that at least some of the measurements of variations of opacity or of coloring on some of the "entangled" samples of the "entangled" support are carried out in differed time to determine at least one complex message memorized by means of a coding associated with the degree with opacity or coloring of some of the "entangled" samples of the "entangled" support.

In another particular mode of the device of manufacturing of the simple product or of the complex product, some sorts of different chromogenic materials can be used and have distant quantum couplings without leaving the framework of this invention. One will be able, thus, to put in good use the utilization of different chromogenic materials in two or several "entangled" samples forming a collection, in order to use some optimal techniques of stimulation of the master "entangled" sample and some optimal techniques of measurement of the slave "entangled" sample for the quantum transmission. One will be able to put in good use the utilization of a mixture of two or several sorts of chromogenic materials in two or several entangled samples to facilitate the use of the "characteristic profiles" defined previously in order to obtain a characteristic response of the "entangled" trapped electrons according to the variation of at least one parameter of stimulation, for example during a stimulation by a fast rise in temperature followed by a slower descent in temperature.

BRIEF DESCRIPTION OF THE DRAWINGS

FIG. 17 illustrates the implementation of a particular mode of the process of quantum reception by means of measurements of the transparency by reflection on the slave "entangled" sample.

FIG. 18 illustrates the implementation of a particular mode of the process of quantum emission by means of the stimulation of a master "entangled" sample by illumination with a suitable beam of light.

FIG. 19 illustrates the implementation of a particular mode of the process of quantum emission by means of stimulation of a master "entangled" sample by illumination with a beam of light of one suitable wavelength.

MANNERS OF IMPLEMENTING THE INVENTION

Manners of implementing the invention are described below. However, it is specified that the present invention may be carried out in various ways. Thus, the specific details mentioned below should not be understood as limiting the implementation, but rather as a descriptive base to support the claims and to teach to the person skilled in the art, the use of the present invention, in a suitable way in practically all of the systems, structures, or exhaustive manners applied to chromogenic materials. In particular, the person skilled in the art can extend the association of a quantum apparatus of emission per stimulation of a chromogenic master "entangled" sample with various suitable equipments of quantum reception measuring a chromogenic slave "entangled" sample, without leaving the framework of the invention.

Figure 16:
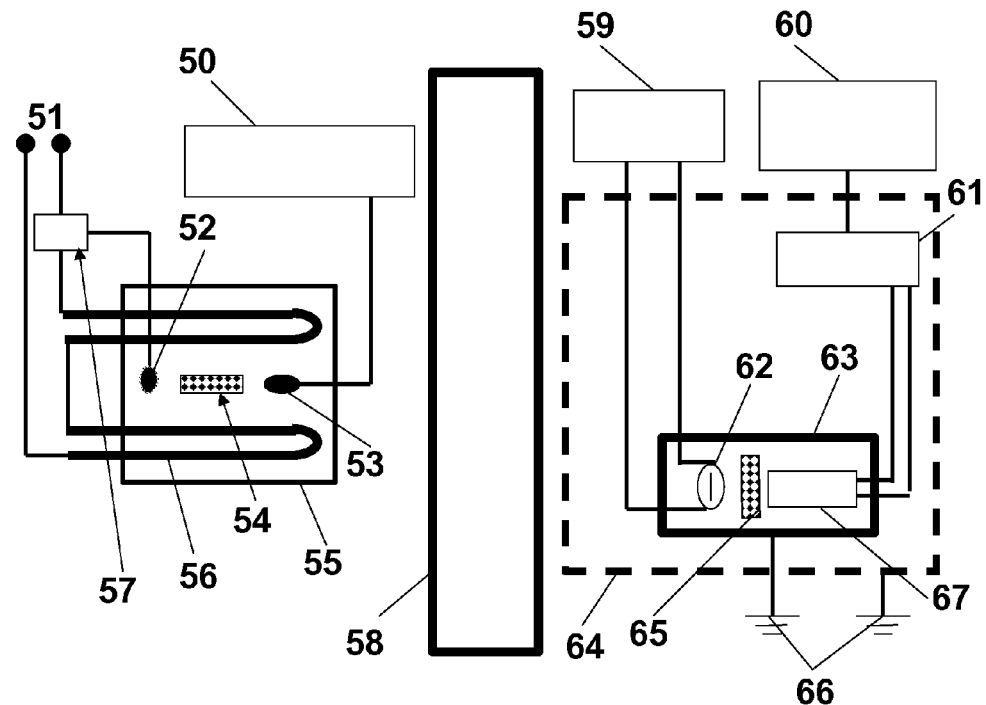
FIG. 16 represents the implementation of a particular mode of the quantum communications processes by using a process of stimulation by heating of the master "entangled" sample and a process of quantum reception by means of measurements of surplus variations of transparency of the slave "entangled" sample.

The implementation of a particular mode of the processes of quantum communications by using a process of stimulation by heating of the master "entangled" sample and a quantum process of reception by means of measurements of variations of transparency of the slave "entangled" sample is represented on FIG. 16. On the left part of the figure, the apparatus of stimulation of the sample is represented. The master sample (54) placed in the oven (55), is heated by resistances (56) and is controlled in temperature by the thermostat (52). A relay (57) cuts the power supply (51) when the maximum temperature is reached. A digital thermometer (53) measures the temperature which is recorded in (50). The wall (58) schematically represents the space separation between the quantum transmitter and the quantum receiver. On the right part of the figure, the quantum apparatus of reception is represented. The slave sample (65) is placed between a source of light (62) and a detector of light (67). A first enclosure (63) protects the sample from the spurious electromagnetic signals. One second enclosure (64) protects the complete system of measurement. The two enclosures are connected to ground in (66). The source of light (62) is powered by the stabilized power supply (59). The detector of light (67) sends the signal in (61), this signal is recorded by the computer (60).

FIG. 17 represents a method of measurement of the transparency of the slave sample (70) by reflection. This sample is equipped with a reflective layer (69). A source of light (62) supplied by the stabilized power supply (59), emits the photons (71). Said photons (72) are measured by the detector of light (67). The detector of light is positioned in order to measure the light rays refracted in the chromogenic part of material. A circuit (61) receives the signals and transmits them to the computer (60) for recording. A partition (73) avoids a direct transmission of the photons (71) towards the detector (67). An obscure and conducting enclosure (63), is connected to ground in (66) to eliminate the spurious electromagnetic signals. Furthermore, a Faraday screen room (68), connected to ground in (66) also ensures one good electromagnetic insulation of the system of measurement. The wall (58) schematically represents space separation between the quantum transmitter and the quantum receiver.

FIG. 18 represents a different method of stimulation of the master sample (54). This sample is stimulated by the rays (76), infrareds for example, of a source of light (75), a laser for example. This source is powered and controlled by the circuit (74). The obscure enclosure (77) contains the sample and the source of light. The wall (58) schematically represents the space separation between the quantum transmitter and the quantum receiver.

FIG. 19 represents another method of stimulation of the master sample adapted for one particular wavelength. The sample (54) is stimulated by the rays (79), coming from the filter (78). The source of light (75), a lamp for example, emits the rays (76) some of which are stopped by the filter (78). This source is powered and controlled by the circuit (74). The obscure enclosure (77) contains the sample and the source of light. The wall (58) schematically represents the space separation between the quantum transmitter and the quantum receiver.

Figure 20:
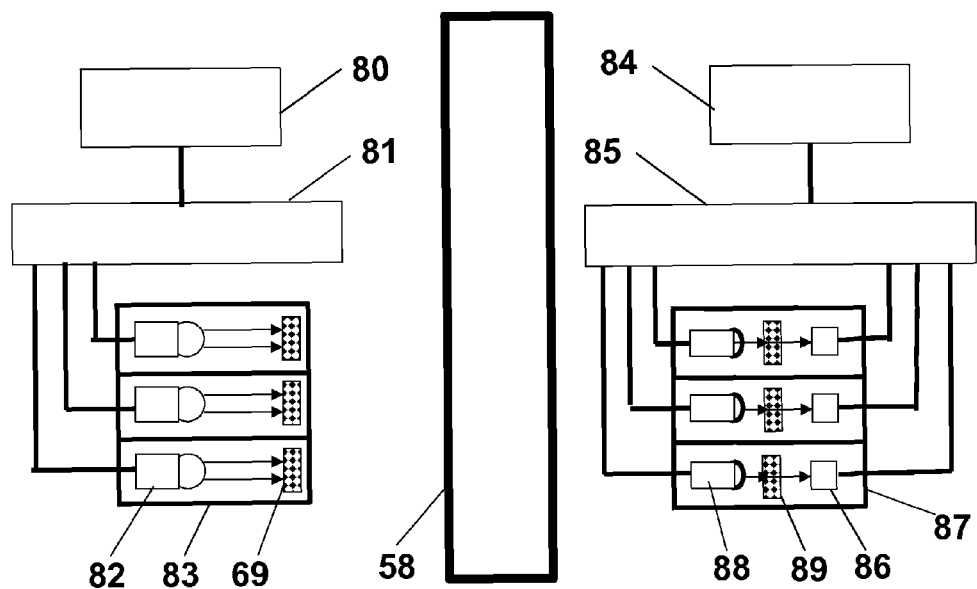
FIG. 20 illustrates the implementation of a particular mode of the processes of quantum communications by using integrated circuits containing a plurality of master "entangled" samples and a plurality of slave "entangled" samples.

FIG. 20 represents the "entangled" samples used in integrated circuits. The various techniques mentioned can be used. On this figure the technique using the photochromic samples is illustrated. On the left part of FIG. 20, an integrated circuit (83) including three samples is represented, but a plurality of samples can be used. The samples (69), are illuminated successively by the laser diodes (82) to stimulate the samples. These elements form an integrated subset. The diodes are activated successively using the processor (81) supplied with the power supply (80). On the right part of FIG. 20, the integrated circuit of reception (87) is represented with three subsets, but a plurality of subsets can be used. Each subset includes a slave sample (89), a laser diode (88) and a detector of light (86) to measure the surplus variation of transparency of the sample. Diodes and detectors are connected to the circuit (85) which transmits the data to the processor (84). The wall (58) symbolizes the distance of the integrated circuits in the quantum transmitter and the quantum receiver. An implementation of the measurement of the response of entangled photochromic materials samples to carry out telecommunications using supports, for example discs, is represented on FIG. 21. On the left part of the figure, the device of quantum emission by stimulation of the samples is represented. The sample of the main disc (94) is stimulated using the source (92), for example an infrared laser. The double arrow (93) represents the radial displacement of the laser. This laser as well as the step motor (95), or the synchronous motor in the case of a continuous motion, is controlled by the processor (91). The laser assembly, step motor, and main disc are contained in an obscure enclosure (96). A power supply is provided in (90). The wall (58) symbolizes the distance of the entangled master disc to the entangled slave disc. On the right part of FIG. 21, the device of quantum reception is represented. The sample of the slave disc (101) is placed between a source of light (103) and a detector of light (100) in order to measure the transparency of said entangled sample when the corresponding sample of the master disc is excited. A motor (104), for example a step motor or a synchronous motor, ensures the rotation of the slave disc. The double arrow (102) represents the radial displacement of the source of light set and of the detector of light. The set, source of light, detector of light, slave disc and motor, are placed in the obscure enclosure (99). The circuit (98) makes possible the coordination of the measurements of transparency and the rotation of the slave disc. A computer (97) records the data of reception. The partition (58) symbolizes the distance of the quantum transmitter to the quantum receiver.

Figure 22:
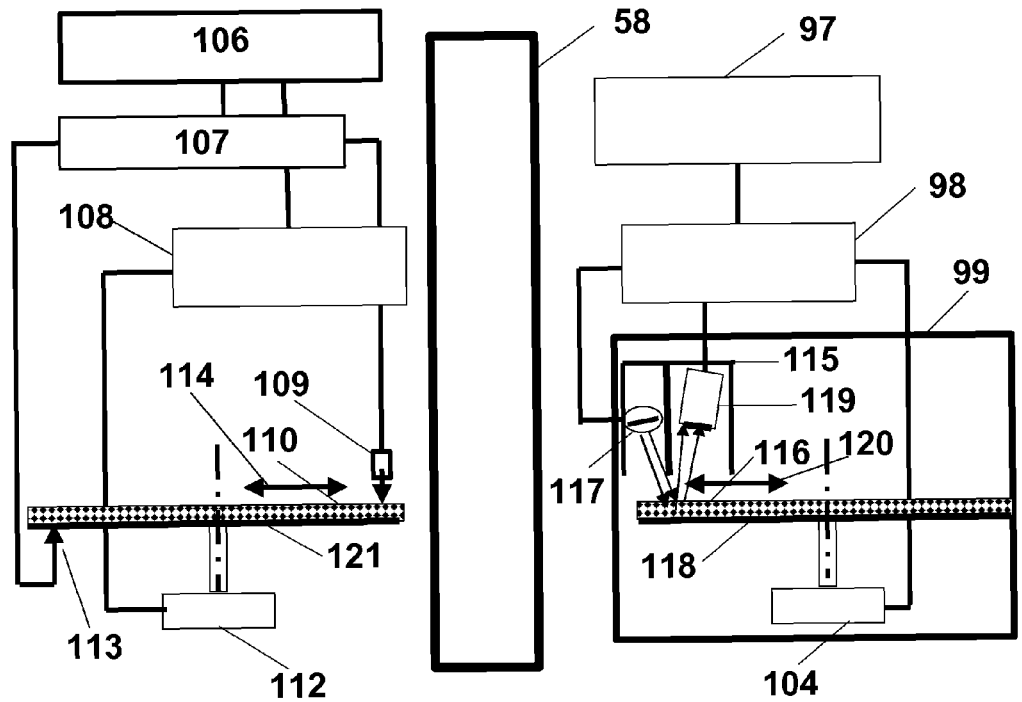
FIG. 22 represents the implementation of a particular mode of the processes of quantum communication based on electrochromic "entangled" samples by using measurements of transparency by reflection through slave "entangled" samples of the support.

An implementation of the measurement of the response of the entangled electrochromic materials samples to carry out quantum communications using support, for example some discs, is represented on FIG. 22. On the left part of the figure, the apparatus of stimulation of the samples is represented. The sample of the main disc (110) is stimulated using a contact (109), supplied with an electric source of tension (107). The radial displacement of the contact is symbolized by the double arrow (114). The return path of the current is carried out by the conducting layer (121) which is connected to the power source (107) by the brush (113). The motor (112), for example a step motor or a synchronous motor in the case of a continuous motion, is controlled by the processor (108). Said processor is powered by the power supply (106). The source of potential (107) is also powered by the power supply (106). The partition (58) symbolizes the distance of the quantum transmitter to the quantum receiver. On the right part of FIG. 22, the device of quantum reception is represented. The sample of the slave disc (116) is placed opposite a source of light (117) and a detector of light (119) in order to measure the transparency of the entangled sample by using the light reflected by the conducting and reflective layer (118) when the corresponding sample of the main disc is excited. The subset (115) which contains the source of light and the detector of light (119) is provided with a partition which decreases the direct transmission of light of the source to the detector. The radial displacement of this subset is symbolized by the double arrow (120). A motor (104), for example a step motor or a synchronous motor, ensures the rotation of the slave disc. The set, source of light, detector, disc, and motor, is placed in the obscure enclosure (99). The circuit (98) makes possible the coordination of measurements of transparency and the rotation of the slave disc. A computer (97) records the data of reception. It should be noted that the change of transparency of the master disc and of the slave disc is quasi-permanent. The person skilled in the art can exploit this property in the design of the quantum transmitter and the quantum receiver. Moreover, these discs can thus be read again if necessary or copied to permanent discs.

BETTER MANNER OF IMPLEMENTING THE INVENTION

Figure 1:
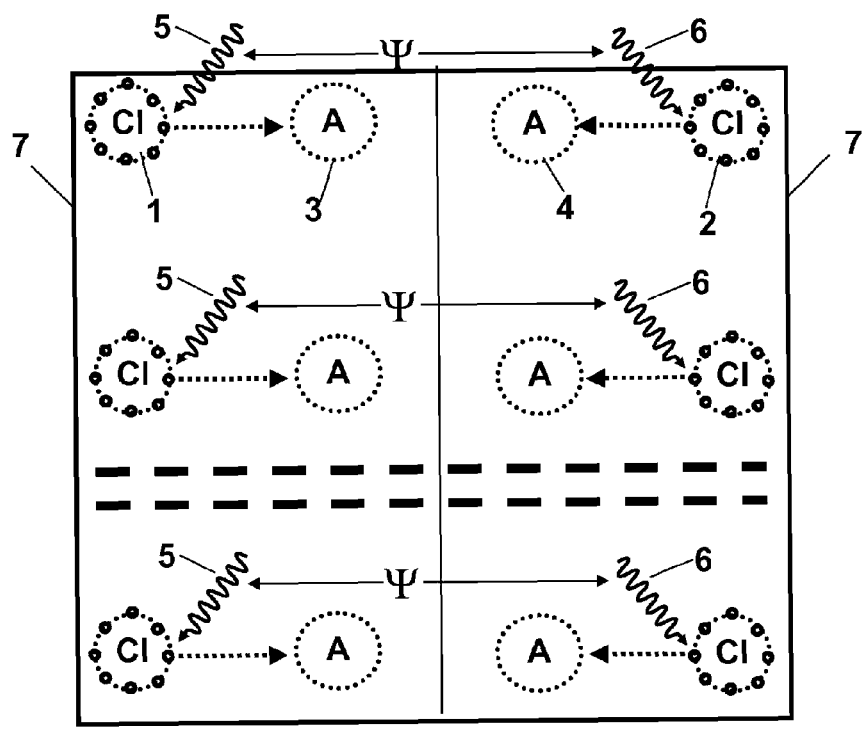
FIG. 1 illustrates a particular mode of the process of excitation of two groups of ions chlorine/silver by two groups of entangled photons.
Figure 2:
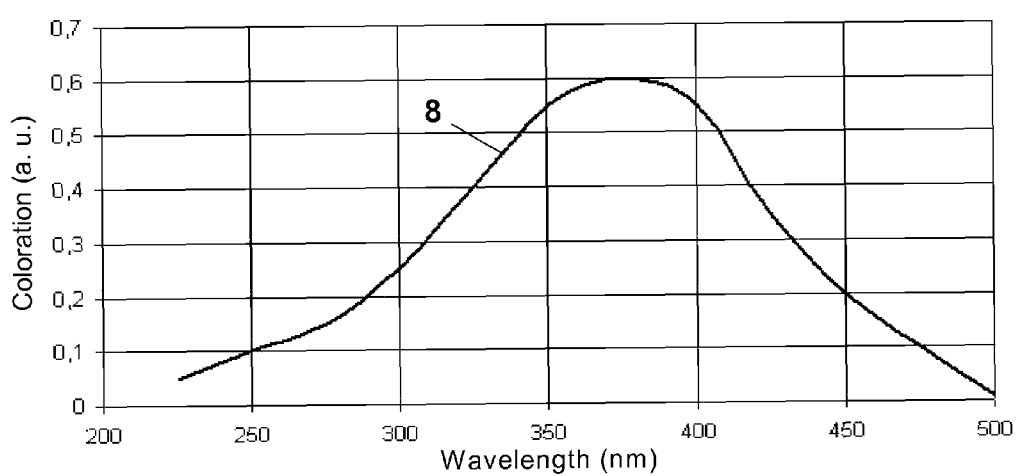
FIG. 2 represents the coloration curve of silver chloride crystal according to the wavelength.
Figure 3:
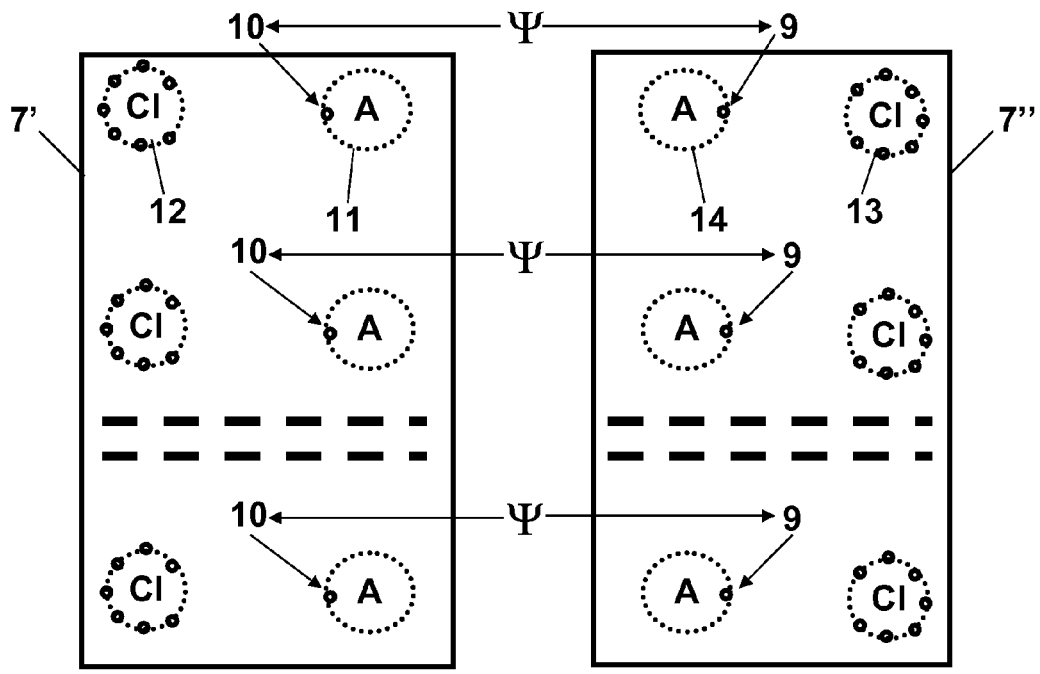
FIG. 3 illustrates the structure of the "entangled" samples obtained after the process of excitation in the case of the silver chloride. They form the products to communicate.
Figure 4:
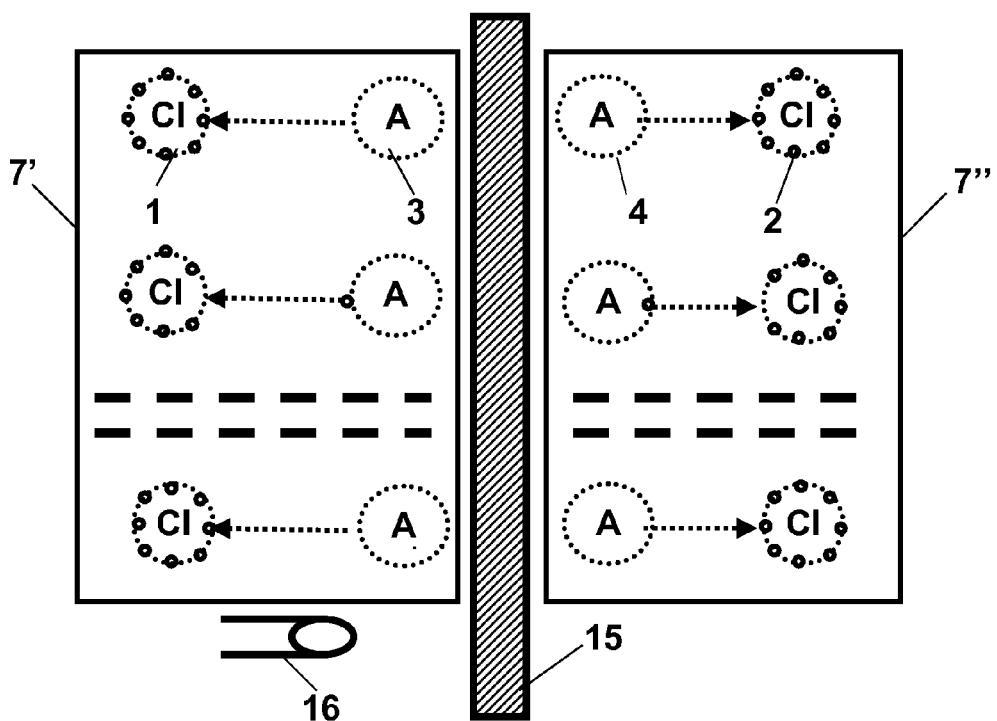
FIG. 4 illustrates a particular mode of the process of stimulation of the atoms of a master "entangled" sample of silver chloride by heating.
Figure 5:
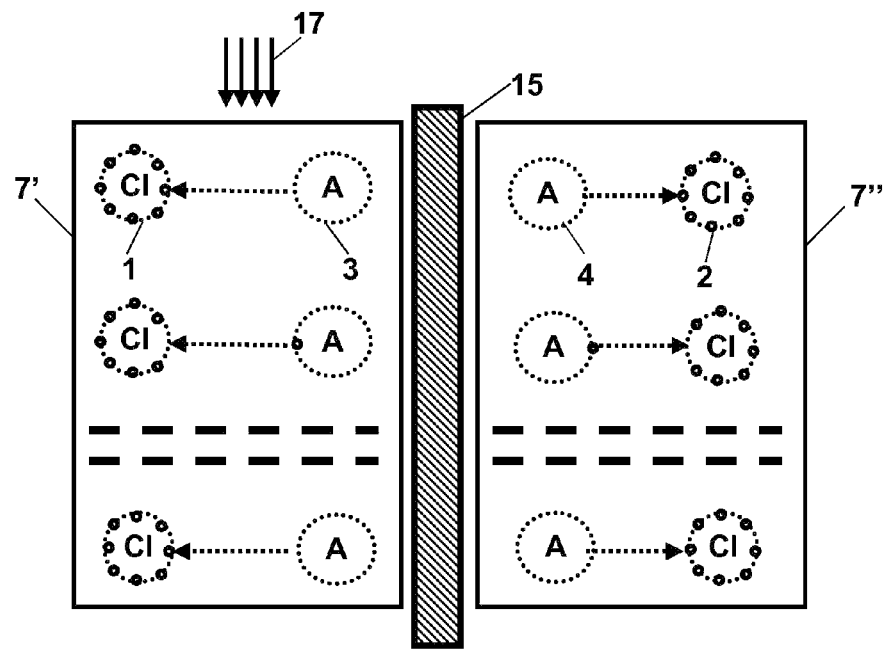
FIG. 5 illustrates a particular mode of the process of stimulation of the atoms of a master "entangled" sample of silver chloride by optical stimulation.
Figure 6:
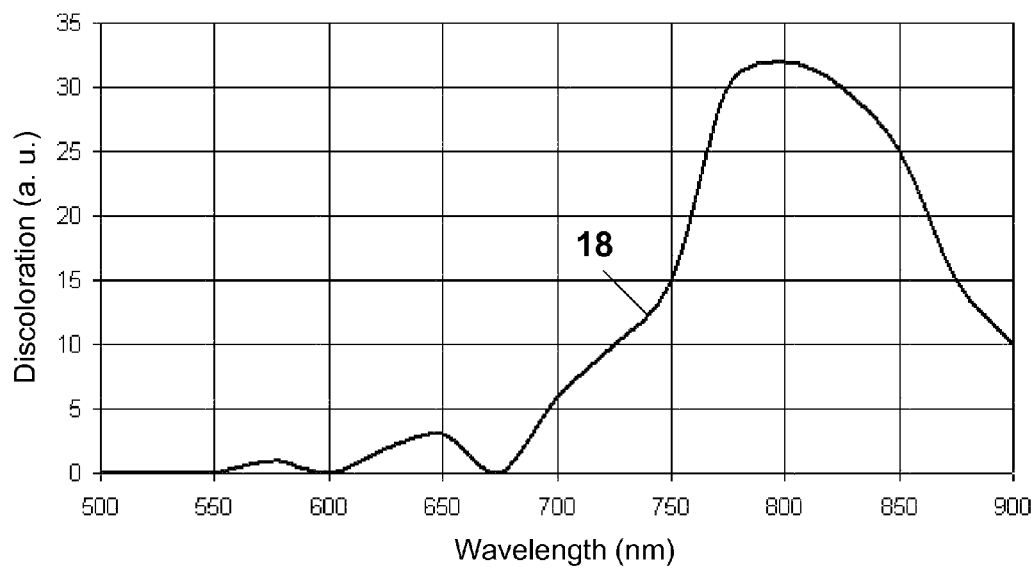
FIG. 6 represents the curve of discoloration by deexcitation (stimulation) of the silver chloride crystals according to the wavelength.
Figure 7:
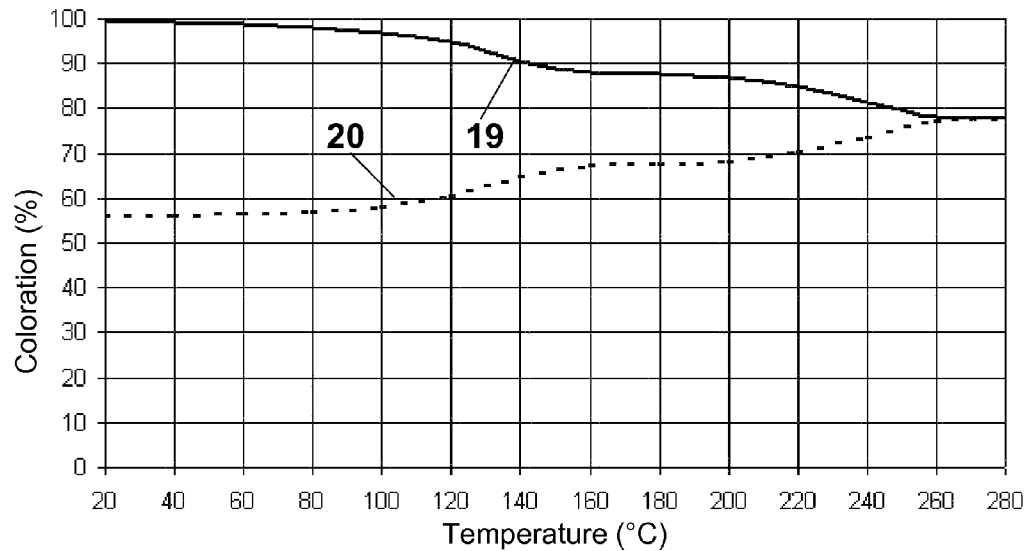
FIG. 7 represents the curve of discoloration by deexcitation (stimulation) of a slave "entangled" sample having two sites of coloring due to a profile of temperature applied to the corresponding master "entangled" sample.
Figure 8:
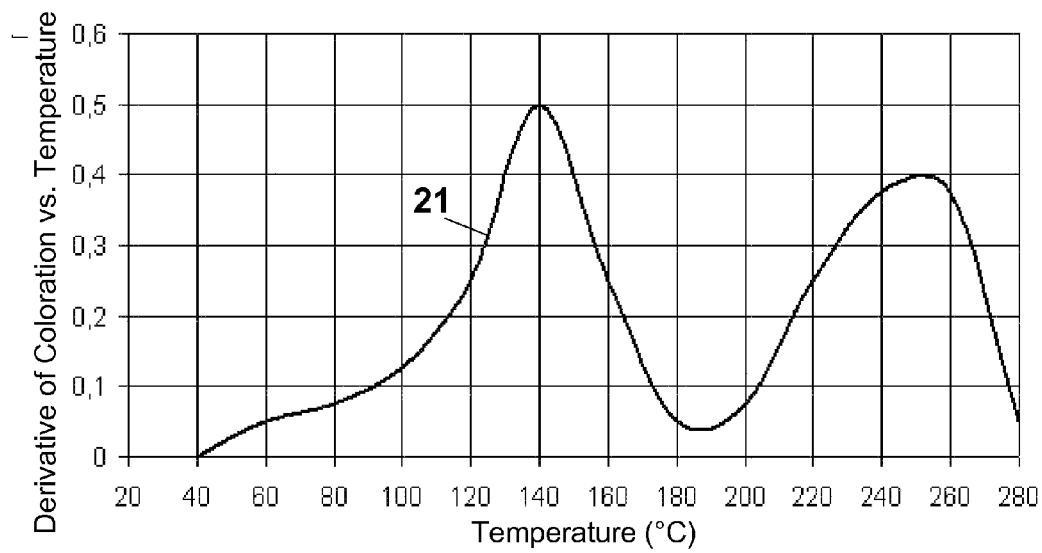
FIG. 8 represents the derivative of the preceding curve.
Figure 9:
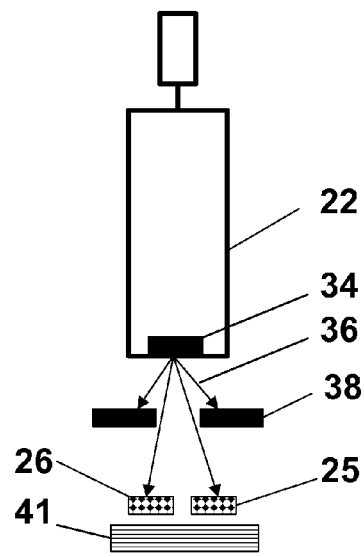
FIG. 9 represents the implementation of a particular mode of the process of excitation of two chromogenic samples using a beam of particles completely or partially entangled.
Figure 10:
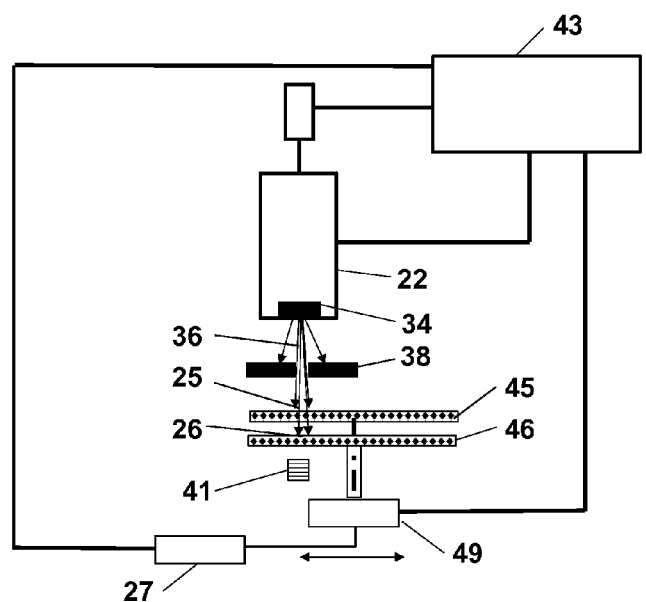
FIG. 10 represents the implementation of a particular mode of the process of excitation of chromogenic samples placed on two supports superimposed using a spectrum of partially entangled photons obtained by Bremsstrahlung effect.
Figure 11:
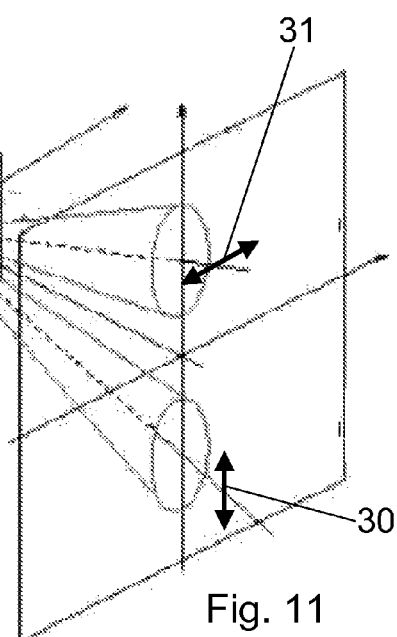
FIG. 11 represents the implementation, in a particular mode, of the production of two beams of entangled photons using a nonlinear crystal.
Figure 12:
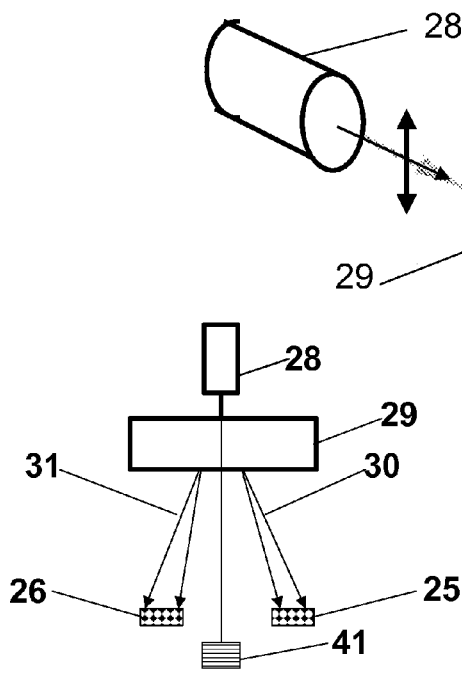
FIG. 12 represents the implementation of a particular mode of the process of excitation of two chromogenic samples using two beams of photons partially or completely entangled, directly produced by a nonlinear crystal.
Figure 13:
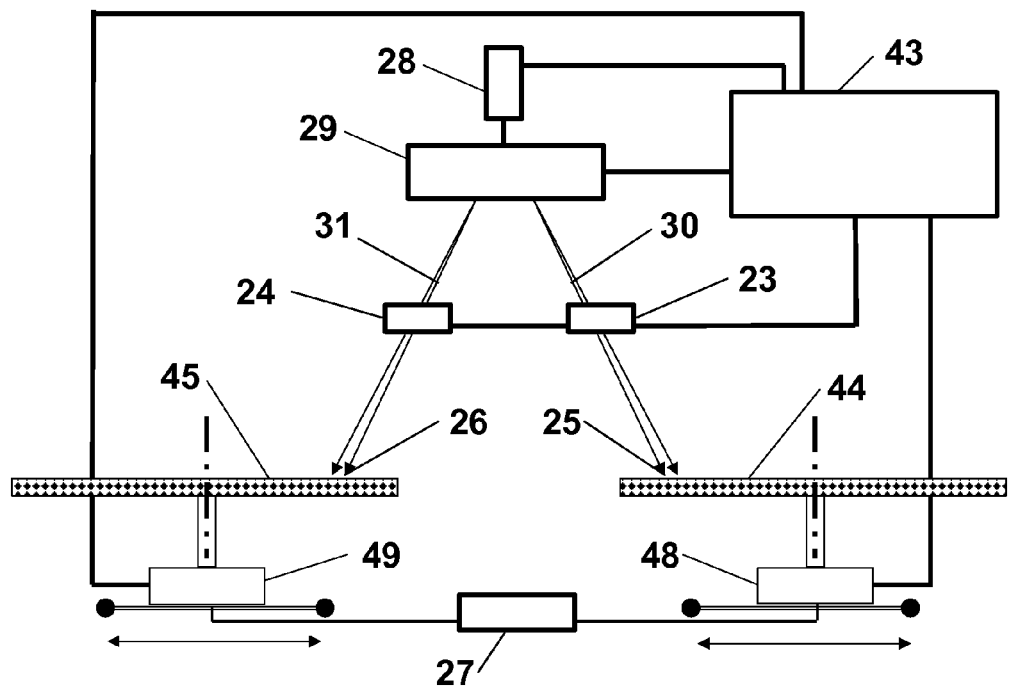
FIG. 13 represents the implementation of a particular mode of the process of excitation of chromogenic samples placed on two supports using two beams of photons partially or completely entangled, directly produced by a nonlinear crystal.
Figure 14:
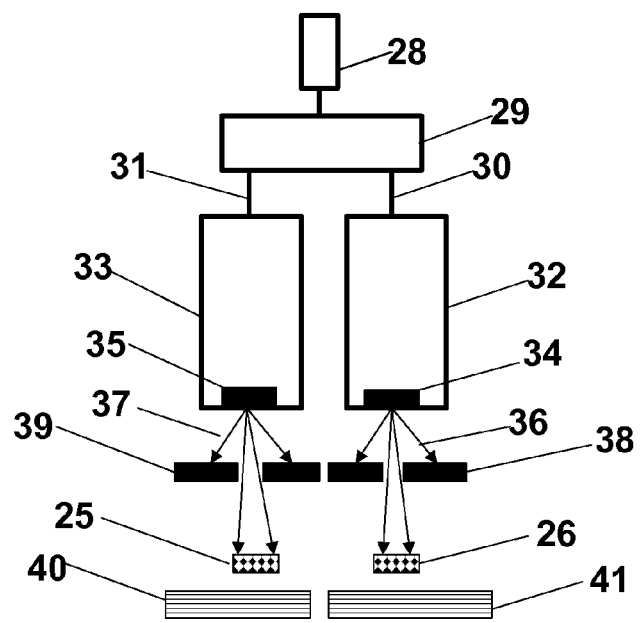
FIG. 14 represents the implementation of a particular mode of the process of excitation of two chromogenic samples using two partially or completely entangled beams of particles.
Figure 15:
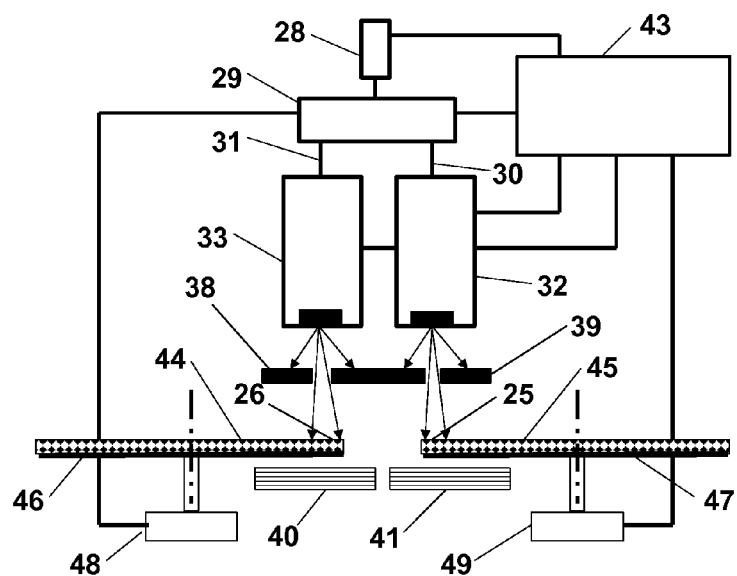
FIG. 15 represents the implementation of a particular mode of the process of excitation of chromogenic samples placed on two supports using two partially or completely entangled beams of particles.

In this mode of implementation, one uses some initially translucent discs comprising a layer of photochromic materials, for example of glasses doped with silver chloride and with preferentially several type of coloring sites. In this mode of implementation, one starts by preferentially producing some collections of "entangled" samples according to a defined scheduling by means of the device of FIG. 10 which uses the process of FIG. 9. In a second step, one separates the "entangled" discs containing the layer of chromogenic materials and one adds a reflective layer on the lower part of the discs. Markings make it possible to control the positions of the entangled samples in relation to each other on each of the two "entangled" discs.

Figure 23:
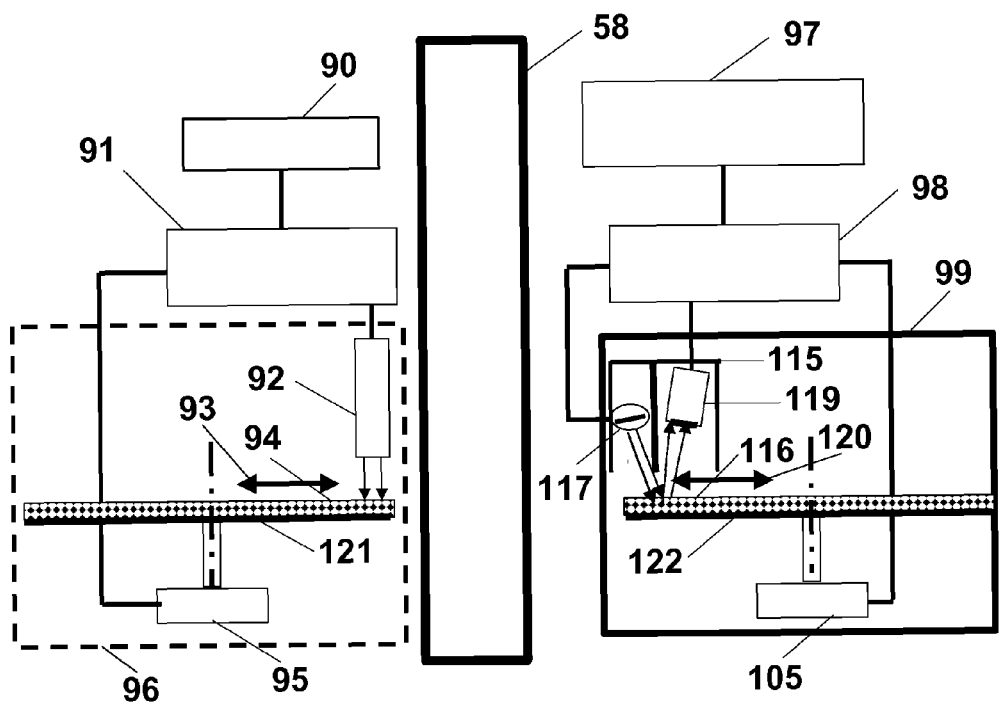
FIG. 23 represents the implementation of a particular mode of the processes of quantum communication based on photochromic "entangled" samples by using measurements of transparency by reflection through slave "entangled" samples of the support.

These "entangled" discs are then positioned as follows: the disc positioned in the quantum transmitter device is named by convention master disc. The disc positioned the quantum receiver device is named by convention slave disc. FIG. 23 illustrates the preferred mode of implementation of the simplex quantum communication. A second similar device is used when duplex quantum communications are implemented. On the left part of FIG. 23, the disc (94), provided with its reflective layer (121), is connected by an axis to a step motor or a synchronous motor (95). The positioning and the rotation speed of the discs are defined with precision for keeping the relation between the "entangled" samples of the same groups on each "entangled" disc. A small surface of the main disc (94) is stimulated using the source of light (92), for example an infrared laser. This stimulation is carried out either with the disc stopped, or while in continuous motion. The radial displacement of the source of light (92) is symbolized by the double arrow (93). The assembly master disc, motor and source of light is contained in an obscure enclosure (96). The source of light (92), the motor (95), step by step, or synchronous in the case of a continuous motion, and radial displacement are controlled by the processor (91). This processor is powered by the power supply (90). The partition (58) symbolizes the distance of the quantum transmitter to the quantum receiver. In a preferential mode, one uses a "characteristic profile" of stimulation, for example an adapted form of the impulse produced by the infrared laser.

On the right part of FIG. 23, the device of quantum reception is represented. The "entangled" sample of the slave disc (116), corresponding to the "entangled" sample of the master disc, is presented opposite a source of light (117) and a detector of light (119), in order to measure the surplus variation of transparency of the "entangled" sample during the stimulation of the corresponding "entangled" sample of the master disc. The subset (115) which contains the source of light (117) and the detector of light (115) is provided with a shield which decreases the direct transmission of light of the source to the detector. The detector of light is positioned in order to measure the light rays refracted in the photochromic material. The reflective layer (122) returns the light towards the detector of light (119). The radial displacement of this subset is symbolized by the double arrow (120). A step motor or a synchronous motor (105) ensures the rotation of the slave disc. The assembly, source of light, detector, disc, and motor, are placed in the obscure enclosure (99). The circuit (98)

allows the coordination of the measurements of the variation of transparency and of the rotation of the slave disc. A computer (97) records the data of reception.

It should be noted that the change of transparency of the main disc and of the slave disc is quasi-permanent. The slave disc can thus be read in differed time.

Figure 24:
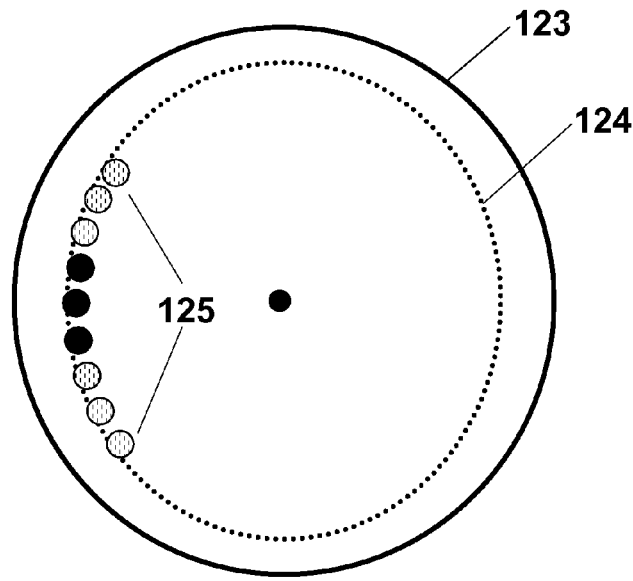
FIG. 24 represents schematically, an example of support constituting a complex product according to the invention in the particular mode where the surface of the support is covered with a photochromic substance. The tracks due to the deexcitation of the slave "entangled" samples caused by the stimulation of the corresponding master "entangled" samples are represented.

A mode particularly simplified of the quantum receiver which takes into account the semi-permanent character of the states of transparency of the "entangled" samples on the slave disc after a quantum reception, consists in carrying out only one differed reading of the slave disc to determine a posteriori the presence of an encoded message. It is also possible to envisage recurring coding, or pseudo random coding to determine some sectors of samples already used by the quantum transmitter. It is also possible to carry out a permanent sweeping in which some of the sectors encode some indications relative to the presence of a new message in other sectors of samples. FIG. 24 illustrates a schematic example of recording on the photochromic material disc (123). A circular track (124) is represented. Completely or partially transparent zones (125) which corresponds to stimulated discrete spots or not stimulated discrete spots, are formed on the disc during the simplex quantum transmission.

Figure 21:
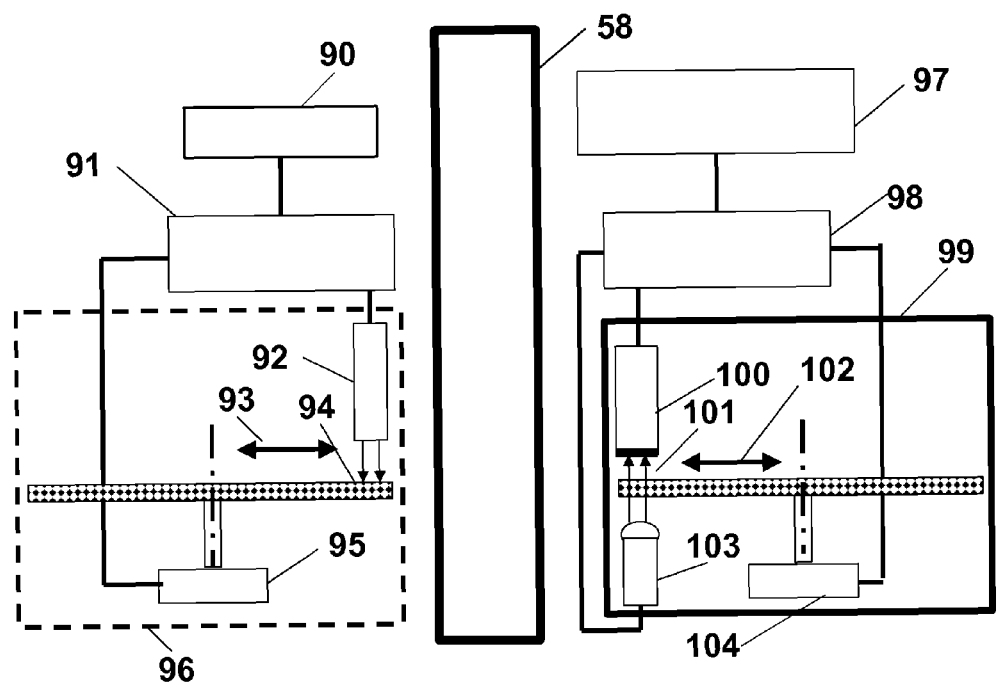
FIG. 21 represents the implementation of a particular mode of the processes of quantum communication by using measurements of transparency by simple transmission through slave "entangled" samples of the support.
Figure 25:
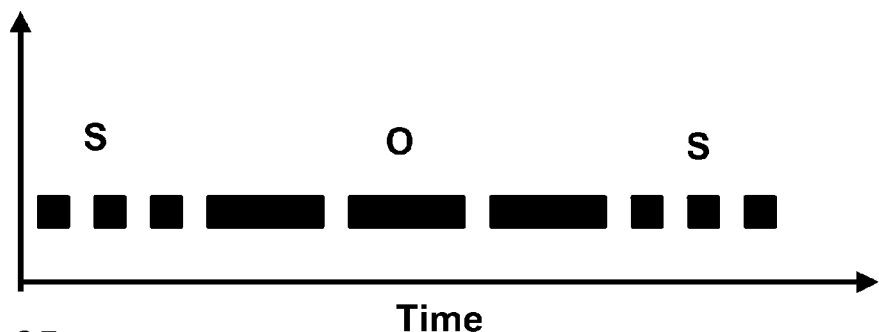
FIG. 25 shows the exploitation in Morse language of the transparency resulting from the tracks of FIG. 24.

FIG. 25 is a schematic example of the reading by the detector (119) of FIG. 21 and corresponding to the slave disc (123) of FIG. 24. Interpretation, by using the Morse code on a purely illustrative basis, gives some points for the clear zones and some dashes for the dark zones. The coding presented gives "S.O.S" signal.

Figure 26:
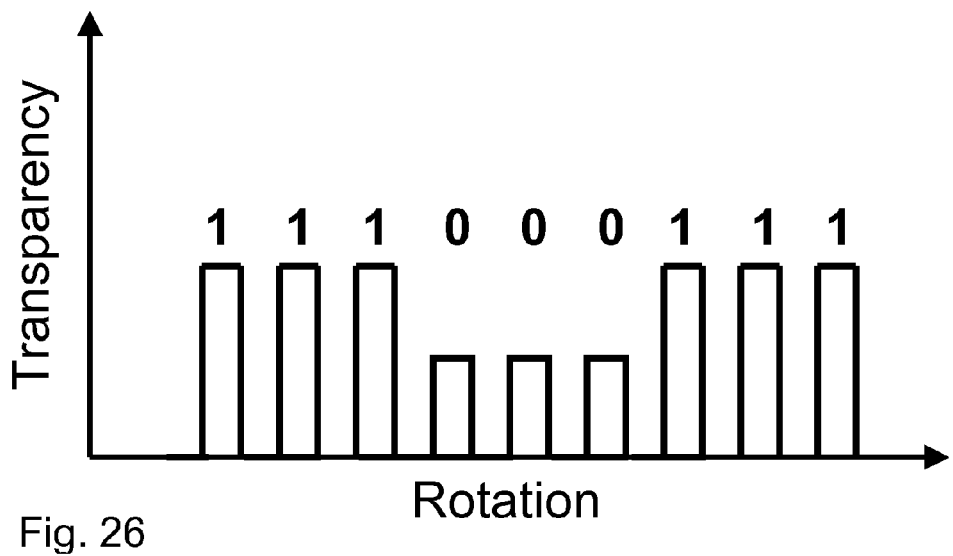
FIG. 26 shows the exploitation in binary language of the transparency resulting from the tracks of FIG. 24.

FIG. 26 is another schematic example of the reading by the detector (119) of FIG. 23 and corresponding to FIG. 24. A binary coding makes it possible to define "bit" of "1" for the dark zones and "bit" of "0" for the clear zones. The coding presented gives signal 111000111. Other types of coding can be used without leaving the framework of the invention.

POSSIBILITIES OF INDUSTRIAL APPLICATIONS

Various industrial applications are immediately possible, simplex communications or duplex communications, real-time communications or differed-time communications, to transmit emergency signals in the mines, sea-beds, at interplanetary distances, etc. Devices according to the invention, including commercial kits of demonstration of the process, can be made up of whole or part of the following equipment: devices of implementation of one of the processes of excitation of chromogenic materials samples as described above, devices of implementation of one of the processes of stimulation of "entangled" chromogenic materials samples as described above,
devices of implementation of one of the processes of detection of surplus variation of opacity or coloring of entangled "chromogenic materials samples" as described above.

Some of these devices, in that they are intended to apply the process object of the invention, can be conceived, manufactured, assembled or exploited by the same company or different companies or in the same place or different places, without leaving the framework of the protection sought by this patent insofar as the aforementioned devices are conceived, manufactured, assembled or used in the place covered by this patent, including the aircraft, the marine vessels, underwater vessels, and space vessels, and the terrestrial probes, marine probes, and space probes. It is the same for the products consisting of "entangled" samples of chromogenic materials, these products being able to be distributed or exploited by the same company or by different companies or in the same place or in different places, without leaving the framework of the protection sought by this patent.

"Entangled" chromogenic materials samples having a metastable state of average or long duration of life, make it possible to implement simple communications, one-way, semi-duplex or duplex. These communications can be detected only by means of one or several of the slave "entangled" samples. They are thus rigorously secret. These communications being recorded on a semi-permanent support, they can be transferred to a permanent support. They are also and practically instantaneous and can be implemented through all mediums and at all distances.

REFERENCES

[1] Einstein A., Podolski B., Rosen N., <<Can Quantum Mechanical Description of Physical Reality Be Considered Complete>>, Physical Review, 47, (1935), pp. 777-780
[2] Bell J. S., <<Speakable and Unspeakable in Quantum Mechanics>>, New York, Cambridge University Press, 1993.
[3] Kurtsiefer C., Oberparleiter M., and Weinfurter H., <<Generation of correlated photon pairs in type II parametric down conversion—revisited>>, Feb. 7 2001, submitted J. Mod. Opt.
[4] Aspect A., <<Trois tests expérimentaux des inégalités de Bell par mesure de corrélation de polarisation de photons>>, Thèse de Doctorat d'Etat, Université de Paris Orsay, 1er Février 1983.
[5] C. H. Bennett, G. Brassard, S. Popescu, B. Schumacher, J. Smolin, and W. Wootters, "Purification of Noisy Entanglement and Faithful Teleportation via Noisy Channels," Phys. Rev. Lett. 76, 722-726 (1996).
[6] Altewischer E., van Exter M. P., and Woerdman J. P., <<Plasmon-assisted transmission of entangled photons>>, Nature, 418, 304-306, (18 Jul. 2002).
[7] Chanelière, T. et al., <<Storage and retrieval of single photons transmitted between remote quantum memories>>, Nature, 438, 833-836, (8 Dec. 2005).
[8] R. F. O'Connell, "Decoherence in Nanostructures and Quantum Systems," Physica E, 19, 77 (2003).
[9] Ghosh S., et al., "Entangled Quantum State of Magnetic Dipoles;" Nature, 425, 48, (2003).
[10] Desbrandes R. and Van Gent D., L., International Filing OMPI Nr. WO 2005/109985, Procédé et appareillage pour modifier la probabilité de désexcitation des nucléides isomères, priority date: Apr. 13, 2004, published on Nov. 24, 2005.
[11] Desbrandes R. and Van Gent D., L., International Filing OMPI Nr. WO 2005/112041, Procédé et appareillage pour communiquer à distance en utilisant des nucléides isomères, priority date: Apr. 13, 2004, published on Nov. 24, 2005.
[12] Desbrandes R. and Van Gent D., L., International Filing OMPI Nr. WO 2005/117306, Procédé et appareillage pour communiquer à distance en utilisant la photoluminescence ou la thermoluminescence, priority dates: May 26, 2004 and Apr. 12, 2004, published on Dec. 8, 2005.
[13] Wangler Thomas P., RF Linear Accelerators (Wiley Series in Beam Physics and Accelerator Technology), Wiley, May 1998.
[14] Sameer S. A. Natto, Belal Moftah, and Noor M. H. Ghassa, <<Heterogeneity Corrections For High Energy Photon Beams (Measurements and Calculations)>>, Journal of Australian Physical & Engineering Sciences in Medecine, 26, 3, pp 78-82, 2003.

[15] Dotsenko A. V., Glebov L. B., Tesekhomsky V. A., *Physics and Chemistry of Photochromic Glasses*, CRC Press, Boca Raton, Fla., 1998.

The invention claimed is:

1. Simple product to communicate comprising a sample (7', 7") characterized in that it includes a chromogenic material excited to at least one metastable state completely or partially opaque or colored, except for materials purely thermochromic, and in that some electrons present in ionic or covalent bonds of the aforesaid chromogenic material, are entangled with electrons present in ionic or covalent bonds of one or several other samples similar to the aforesaid sample, the aforesaid sample being called thereafter by convention entangled sample, the aforementioned entangled sample being able to be separated in space from the aforesaid other samples and presenting remote quantum couplings between some of its electrons and some of the electrons of one or several of the aforesaid other samples.

2. Simple product according to claim 1 characterized in that the aforementioned chromogenic material included in the aforementioned entangled sample is a photochromic material.

3. Simple product according to claim 1 characterized in that the aforementioned chromogenic material included in the aforementioned entangled sample is a photosensitive material.

4. Simple product according to claim 1 characterized in that the aforementioned chromogenic material included in the aforementioned entangled sample, is an electrochromic material.

5. Simple product according to claim 1 characterized in that the aforementioned chromogenic material included in the aforementioned entangled sample is an organochromic material.

6. Simple product according to claim 1 characterized in that the aforementioned chromogenic material included in the aforementioned entangled sample is a material non-photoluminescent and non-thermoluminescent in order not to disturb measurements of variation of opacity or coloring on the aforementioned entangled sample.

7. Complex product to communicate characterized in that it includes a plurality of entangled samples according to claim 1 of simple product, which are laid out on a support, for example a disc (44, 45), called thereafter by convention entangled support (123), the aforementioned entangled samples being positioned (125) on the aforementioned support according to a defined scheduling, whole or part of the aforesaid entangled samples each one presenting aforesaid remote quantum couplings with one or more aforesaid other samples distributed on one or several other supports similar to the aforesaid support.

8. Complex product according to claim 7 characterized in that at least one of the aforesaid entangled supports is an integrated circuit (83) associating to at least some of the aforesaid entangled samples (69), a microelectronics device which is appropriate to stimulate whole or part of the aforesaid entangled samples, for example by means of integrated diodes (82).

9. Complex product according to claim 7 characterized in that at least one of the aforesaid entangled supports is an integrated circuit (87) associating to at least some of the aforesaid entangled samples (89), a microelectronics device which is appropriate to measure at least one surplus variation of opacity or coloring, for example by transparency, by means of diodes (88) and of integrated photodiodes (86).

10. Process comprising the following steps:
(a) preparing simultaneously one or several samples (7, 25, 26) including a chromogenic material having at least one metastable state completely or partially opaque or colored, except purely thermochromic materials;
(b) proceeding to at least one of the following processing, called processing of excitation thereafter, either at least to one bombardment, or at least to one irradiation or at least to one illumination of the aforementioned one or several samples by means of particles which are appropriate to excite the aforementioned chromogenic material to the aforementioned metastable state, the aforementioned bombardment or bombardments, or the aforementioned irradiation or irradiations, or the aforementioned illumination or illuminations, comprising groups of entangled particles, the aforementioned entangled particles transferring their entanglement to the aforesaid chromogenic material which is excited to the aforementioned metastable state, one or several of the aforementioned samples being able to be divided and/or separated to form a collection of samples, called by convention entangled samples, each entangled sample forming one simple product.

11. Process according to claim 10 characterized in that the aforementioned entangled particles used for the aforementioned processing of excitation comprise entangled photons which are appropriate to excite the aforementioned chromogenic material to the aforementioned metastable state.

12. Process according to claim 11 characterized in that the aforementioned entangled photons include entangled gamma, entangled X, or entangled ultra-violets or entangled visible photons.

13. Process according to claim 11 characterized in that the aforementioned entangled photons comprise photons which are emitted either by a natural or artificial radioactive material composed of atoms emitting several photons in a cascade, or by a target bombarded by accelerated particles which emits groups of photons by Bremsstrahlung effect, or by a material made up of atoms emitting, by ionization in a cascade, groups of entangled photons, or by a generator emitting groups of entangled photons, these groups of photons being distributed in at least two separate beams partially or almost completely entangled.

14. Process according to claim 11 characterized in that the aforementioned chromogenic material comprises some ionic bindings between metal atoms and halogenous atoms, and in that the aforementioned bonds are broken during the aforesaid processing of excitation to the aforementioned metastable state, and in that the aforementioned entangled photons transfer their entanglement to the electrons released by the aforementioned ionic bonds, the aforementioned electrons being captured by the aforementioned metal atoms.

15. Process according to claim 11 characterized in that the aforementioned chromogenic material included in the aforementioned samples is an organochromic material having at least one covalent bond which makes it possible to pass from the ground state of an open form to a closed form, constituting the aforementioned metastable state, and in that during the aforesaid processing of excitation to the aforementioned metastable state, the aforementioned entangled photons transfer their entanglement to the electrons pertaining to the aforementioned covalent bonds.

16. Process according to claim 11 characterized in that the aforementioned chromogenic material included in the aforementioned samples is a photochromic material.

17. Process according to claim 11 characterized in that the aforementioned chromogenic material included in the aforementioned samples is a photosensitive material.

18. Process according to claim 10 characterized in that the aforementioned entangled particles, used for the aforesaid processing of excitation, comprise accelerated electrons which are appropriate to excite the aforementioned chromogenic material to the aforementioned metastable state.

19. Process according to claim 18 characterized in that the aforementioned accelerated electrons comprise some entangled electrons emitted by either photocathodes illuminated by entangled photons coming from a non-linear crystal, or by a multiplier-accelerator of electrons producing some entangled electrons.

20. Process according to claim 18 characterized in that the aforementioned chromogenic material included in the aforementioned samples is an electrochromic material.

21. Process according to claim 10 characterized in that the aforementioned chromogenic material included in the aforementioned samples is an electrochromic material, and in that the aforementioned entangled particles, used for the aforesaid processing of excitation, comprise, either accelerated electrons which are appropriate to excite the aforementioned electrochromic material to the aforementioned metastable state, or photons which are appropriate to excite the aforementioned electrochromic material to the aforementioned metastable state.

22. Process according to claim 10 characterized in that the aforementioned chromogenic material included in the aforementioned samples is a photochromic material.

23. Process according to claim 10 characterized in that the aforementioned chromogenic material included in the aforementioned samples is a photosensitive material.

24. Process according to claim 10 characterized in that the aforementioned chromogenic material included in the aforementioned samples is an electrochromic material.

25. Process according to claim 10 characterized in that the aforementioned chromogenic material included in the aforementioned samples is a material non-photoluminescent and non-thermoluminescent.

26. Process according to claim 10 comprising the following additional steps:
(a) separating in space whole or part of the aforesaid entangled samples;
(b) using in a quantum emitter at least one of the aforesaid entangled samples, qualified as master entangled sample (54, 69, 94, 110), to remotely transmit at least one information or at least one command, using whole or part of the remote quantum connections between the aforesaid entangled samples, by causing at least one stimulation, which is appropriate to cause the return to the ground state of the excited aforesaid chromogenic material, applied to the aforesaid master entangled sample, for example, either by heating it in its totality, or by heating it in at least one spot of its surface, or by optical stimulation using at least one flash of infra-red, visible or ultraviolet light on its totality, either by optical stimulation using at least one flash of infra-red, visible or ultraviolet light in at least one spot of its surface, or by application of an electric current in the particular case of electrochromic materials, said stimulation characterizing an information or a command to be remotely transmitted;
(c) using in a quantum receiver at least one of the aforesaid entangled samples, qualified as slave entangled sample (65, 70, 89, 101, 116), to receive at least one remote information or at least one remote command by using whole or part of the aforesaid remote quantum connections in real-time or in differed time in order to determine, either at least one detection of a remote information, or at least one detection of a remote command, by means of at least one measurement, made with a source of light and a detector of light, for example a photomultiplier or one or several photodiodes, of at least one surplus variation of opacity or coloring, on said chromogenic material included in the aforesaid slave entangled sample.

27. Process according to claim 26 characterized in that the aforementioned "quantum emitter", applies a stimulation by means of at least one "characteristic profile" at one predetermined instant, or on a predetermined temporal window that may be variable according to a pseudo-random law, and in that the aforementioned "quantum receiver", or at least one of the "quantum receivers", applies the aforementioned process to determine, either at least one aforementioned detection of a remote information, or at least one aforementioned detection of a remote command, either in relation to said predetermined instant, or in relation to said predetermined temporal window, that may be variable according to the aforementioned pseudo-random law.

28. Method of quantum emission applied to a simple product comprising a sample (7', 7") including a chromogenic material excited to at least one metastable state completely or partially opaque or colored, except for materials purely thermochromic, and some electrons present in ionic or covalent bonds of the aforesaid chromogenic material, which are entangled with electrons present in ionic or covalent bonds of one or several other samples similar to the aforesaid sample, the aforesaid sample being called thereafter by convention entangled sample, the aforementioned entangled sample being able to be separated in space from the aforesaid other samples and presenting remote quantum couplings between some of its electrons and some of the electrons of one or several of the aforesaid other samples, in which the aforementioned remote quantum couplings are used by causing at least one stimulation of deexcitation of the aforesaid electrons of ionic or covalent bonds, called thereafter stimulation, which is appropriate to cause the return to the ground state of the excited aforesaid chromogenic material, applied to the aforementioned entangled sample, qualified as master entangled sample (54, 69, 94, 110), the aforementioned stimulation characterizing an information or a command to be remotely transmitted.

29. Method according to claim 28 characterized in that the aforementioned chromogenic material included in the aforementioned master entangled sample is a photochromic material.

30. Method according to claim 28 characterized in that the aforementioned chromogenic material included in the aforementioned master entangled sample is a photosensitive material.

31. Method according to claim 28 characterized in that the aforementioned chromogenic material included in the aforementioned master entangled sample (110) is an electrochromic material.

32. Method according to claim 28 characterized in that the aforementioned stimulation of the aforesaid master entangled sample comprises infrared, visible, or ultra-violet radiations optimized in energy of the photons for at least one of the aforesaid chromogenic material.

33. Method according to claim 28 characterized in that the aforementioned master entangled sample is stimulated by at least one beam, for example produced by a laser, in a spot of the surface of the aforesaid master entangled sample, this spot representing a surface of 100 square nanometers to 1 square centimeter.

34. Method according to claim 28 characterized in that the aforementioned stimulation applied to the aforementioned master entangled sample is modulated, either in amplitude and/or versus time.

35. Method according to claim 28 wherein the aforementioned stimulation comprises at least one characteristic profile during a time interval, by applying, according to the mode, one or successively several profiles of variation of at least one parameter of stimulation applied versus time, called by convention "characteristic profiles", in order to transitorily modify the probability of deexcitation of some of the entangled aforesaid electrons of ionic or covalent bonds of the chromogenic material, by means of the stimulation applied by one or several of the aforesaid "characteristic profiles", and optionally by feedback.

36. Method according to claim 28 characterized in that the aforementioned chromogenic material included in the aforementioned master entangled sample is a material non-photoluminescent and non-thermoluminescent.

37. Method of quantum reception applied to a simple product comprising a sample (7', 7'') including a chromogenic material excited to at least one metastable state completely or partially opaque or colored, except for materials purely thermochromic, and some electrons present in ionic or covalent bonds of the aforesaid chromogenic material, which are entangled with electrons present in ionic or covalent bonds of one or several other samples similar to the aforesaid sample, the aforesaid sample being called thereafter by convention entangled sample, the aforementioned entangled sample being able to be separated in space from the aforesaid other samples and presenting remote quantum couplings between some of its electrons and some of the electrons of one or several of the aforesaid other samples, in which the aforementioned remote quantum couplings are used in real-time or in differed time for the determination, either of at least one detection of remote information, or of at least one detection of a remote command, by means of at least one measurement, made with a source of light and a detector of light, of at least one surplus variation of opacity or coloring, on the aforesaid chromogenic material included in at least one aforesaid entangled sample, qualified as slave entangled sample (65, 70, 89, 101,116).

38. Method according to claim 37 characterized in that the aforementioned chromogenic material included in the aforementioned slave entangled sample is a photochromic material.

39. Method according to claim 37 characterized in that the aforementioned chromogenic material included in the aforementioned slave entangled sample is a photosensitive material.

40. Method according to claim 37 characterized in that the aforementioned chromogenic material included in the aforementioned slave entangled sample is an electrochromic material.

41. Method according to claim 37 characterized in that the aforementioned determination, either of at least one detection of remote information, or of at least one detection of a remote command, is carried out versus time, and comprises at least one series of measures (19, 20) of the aforesaid surplus variation of opacity or coloring in at least one optical line or at least one bandwidth of optical wavelengths, on at least one aforesaid slave entangled sample, one or several of the aforesaid series of measurements being interpreted (21) by at least one method of calculating the correlation, in relation to at least one property of one or several "characteristic profiles" used for the activation of the aforesaid remote quantum couplings, to determine the reception of at least one information, coded by the one aforementioned or several aforementioned "characteristic profiles".

42. Method according to claim 41 characterized in that the aforementioned determination exploits at least two series of measurements out of at least two slave entangled samples for the aforementioned method of calculating the correlation.

43. Method according to claim 37 characterized in that the aforementioned chromogenic material included in the aforementioned slave entangled sample is a material non-photoluminescent and non-thermoluminescent in order not to disturb the aforementioned measurement of at least one surplus variation of opacity or coloring on the aforementioned entangled sample.

* * * * *